US009024627B2

(12) United States Patent
Inoue et al.

(10) Patent No.: US 9,024,627 B2
(45) Date of Patent: May 5, 2015

(54) MOTOR ACTUATOR

(71) Applicant: Asmo Co., Ltd., Shizuoka-ken (JP)

(72) Inventors: Hiroto Inoue, Toyoahashi (JP);
Tomonobu Hyodo, Kosai (JP)

(73) Assignee: Asmo Co., Ltd., Shizuoka-ken (JP)

( * ) Notice: Subject to any disclaimer, the term of this patent is extended or adjusted under 35 U.S.C. 154(b) by 80 days.

(21) Appl. No.: 13/925,399

(22) Filed: Jun. 24, 2013

(65) Prior Publication Data

US 2014/0000399 A1 Jan. 2, 2014

(30) Foreign Application Priority Data

Jun. 26, 2012 (JP) ................................ 2012-143188
Jul. 4, 2012 (JP) ................................ 2012-150754

(51) Int. Cl.

| G01B 7/30 | (2006.01) |
| H02K 7/116 | (2006.01) |
| H02K 11/00 | (2006.01) |
| G01R 1/04 | (2006.01) |
| F16H 57/023 | (2012.01) |
| F16H 1/02 | (2006.01) |
| B60H 1/00 | (2006.01) |
| F16H 57/02 | (2012.01) |
| F16H 57/025 | (2012.01) |

(52) U.S. Cl.
CPC ............. *F16H 57/023* (2013.01); *F16H 1/02* (2013.01); *F16H 2057/02082* (2013.01); *F16H 57/025* (2013.01); *B60H 1/00857* (2013.01)

(58) Field of Classification Search
USPC .................. 310/68 B, 71, 75 R, 83, 80, 68 R; 324/207.25, 174, 156; 475/149, 475/151–152; 74/425; 318/15, 653
See application file for complete search history.

(56) References Cited

U.S. PATENT DOCUMENTS

| 4,915,493 | A | * | 4/1990 | Fisher et al. .................. 359/874 |
| 4,930,370 | A | * | 6/1990 | Yoshida ....................... 74/502.1 |
| 5,724,200 | A | * | 3/1998 | Mochizuki .................... 359/877 |
| 5,777,410 | A | * | 7/1998 | Asakura et al. ................. 310/71 |
| 5,900,999 | A | * | 5/1999 | Huizenga et al. ............. 359/877 |
| 6,213,612 | B1 | * | 4/2001 | Schnell et al. ................ 359/877 |
| 6,407,543 | B1 | * | 6/2002 | Hagio et al. ............. 324/207.25 |
| 6,902,438 | B2 | * | 6/2005 | Tsuyama ...................... 439/694 |
| 7,402,926 | B2 | * | 7/2008 | Shinmura et al. ............... 310/83 |
| 8,659,198 | B2 | * | 2/2014 | Inoue ............................. 310/71 |
| 2005/0006966 | A1 | * | 1/2005 | Oishi et al. .................. 310/75 R |
| 2006/0164030 | A1 | * | 7/2006 | Kujira et al. .................. 318/439 |
| 2013/0127304 | A1 | * | 5/2013 | Belanger et al. ............ 310/68 B |

FOREIGN PATENT DOCUMENTS

| JP | 2004-304951 A | 10/2004 |
| JP | 2012-090510 A | 5/2012 |

* cited by examiner

*Primary Examiner* — Burton Mullins
(74) *Attorney, Agent, or Firm* — Christensen Fonder P.A.

(57) ABSTRACT

A motor actuator includes a housing, and a plurality of output mechanisms accommodated in the housing. The housing includes a fastening unit that fastens a first case and a second case. Each of the plurality of output mechanisms includes a motor and a plurality of deceleration gears. The motor is supported by the housing. A final state deceleration gear is rotatably supported by the housing. The fastening unit is arranged in a first fastening unit formation range. The first fastening unit formation range is a range formed by connecting contours of a plurality of motors and contours of a plurality of final state deceleration gears, and is a range that surrounds the plurality of motors and the plurality of final stage deceleration gears.

6 Claims, 15 Drawing Sheets

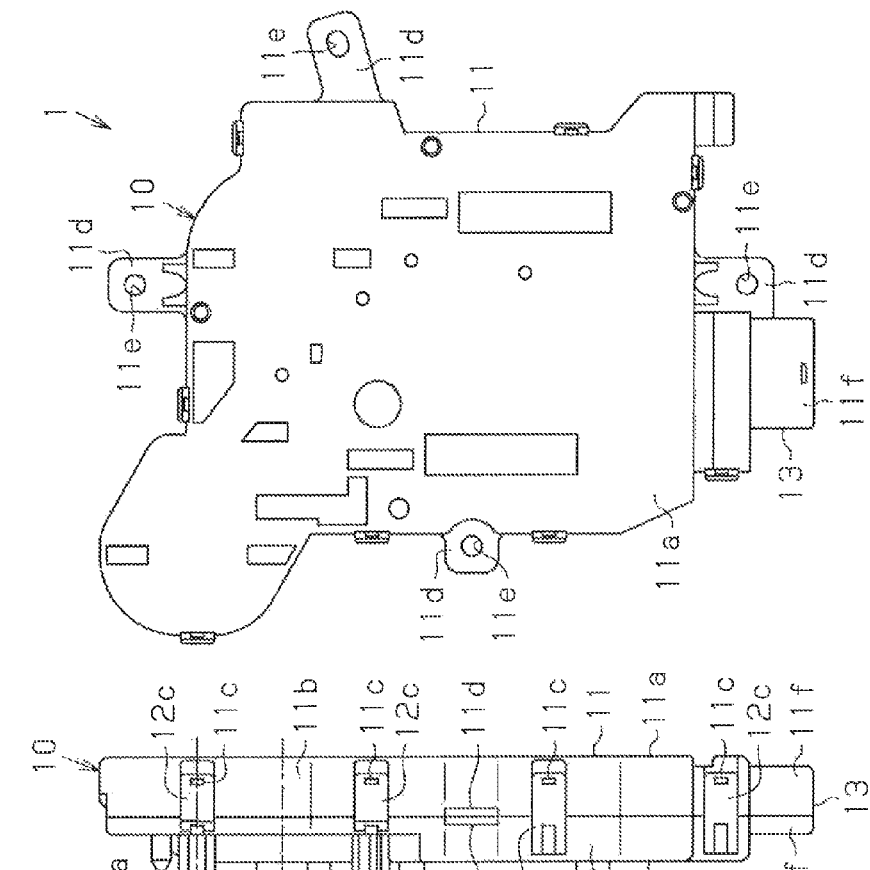
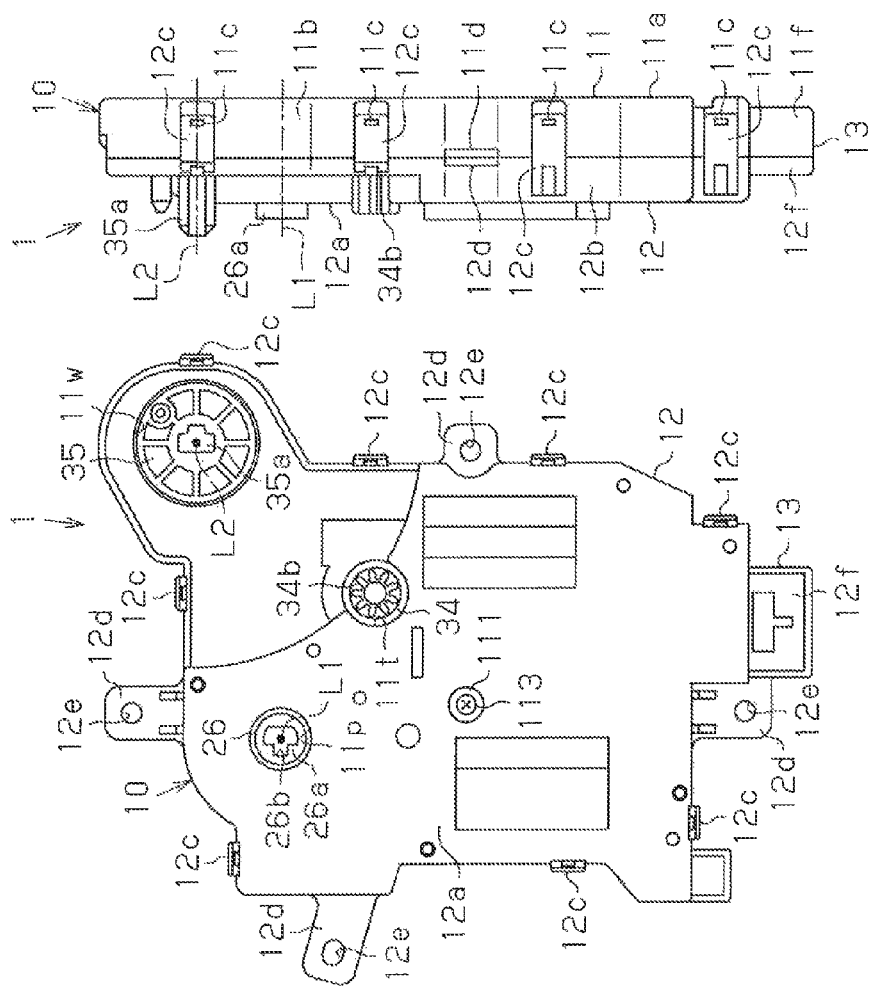

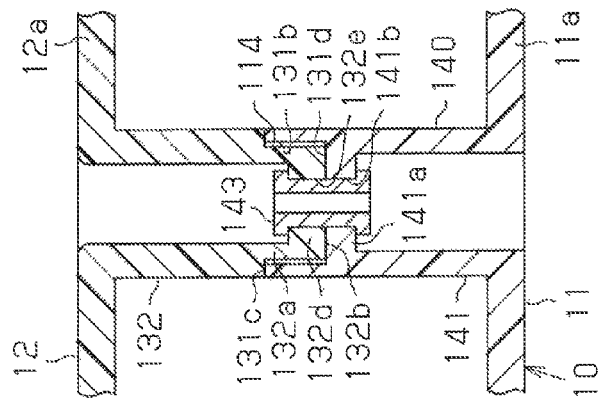
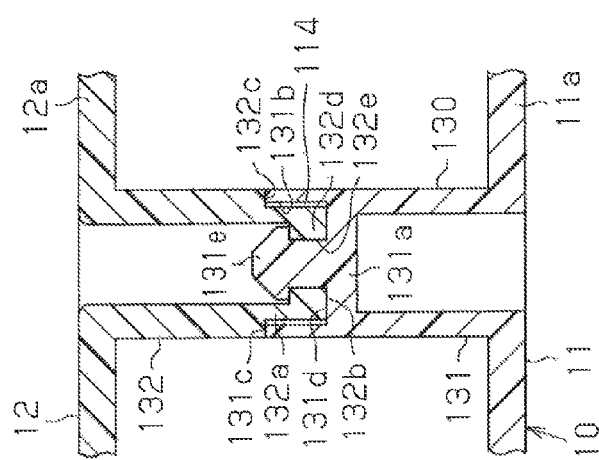
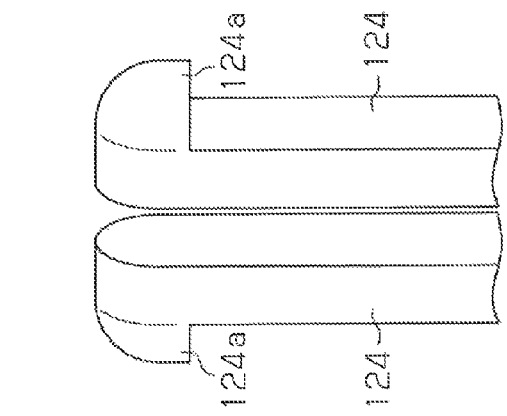

MOTOR ACTUATOR

BACKGROUND OF THE INVENTION

The present invention relates to a motor actuator.

A vehicle air conditioner of the prior art includes a blower duct switching door (various dampers) driven by a motor actuator that uses a motor as a drive source. Japanese Laid-Open Patent Publication No. 2004-304951 and Japanese Laid-Open Patent Publication No. 2012-90510 each describe an example of a motor actuator that accommodates an output mechanism, which includes a single motor and deceleration gears for decelerating and outputting the rotation of the motor, in a box-shaped housing. The housing includes a first case and a second case, which are overlapped with each other. A plurality of engagement pieces formed on an outer surface of the second case are snap-fitted and engaged with a plurality of engagement projections formed on an outer surface of the first case to fix the first case and the second case to each other. Further, the housing supports the motor. The housing supports a final stage of the deceleration gears that outputs the rotation of the motor to the exterior.

In addition to the single motor and the deceleration gears, the output mechanism of Japanese Laid-Open Patent Publication No. 2012-90510 further includes a position detection sensor, which outputs a position detection signal corresponding to a rotation position of the deceleration gear, a sensor signal line, which transmits the position detection signal output from the position detection sensor to a control unit that controls the rotation of the motor, and a power supplying terminal unit, which is connected to the motor to supply power to the motor. The sensor signal line and the power supplying terminal unit may be formed integrally with the position detection sensor so that the output mechanism may easily be coupled to the housing. In this structure, the sensor signal line, the power supplying terminal unit, and the position detection sensor are integrated with one another by, for example, an insulative resin material.

In recent years, left-right independently temperature-controlled type vehicle air conditioners and up-down independently temperature-controlled type vehicle air conditioners have increased to improve comfort in automobiles. Such a vehicle air conditioner allows for air conditioning to be finely controlled.

A left-right independently temperature-controlled type vehicle air conditioner and an up-down independently temperature-controlled type vehicle air conditioner include more blower duct switching doors than a left-right commonly temperature-controlled type vehicle air conditioner and an up-down commonly temperature-controlled type vehicle air conditioner. Accordingly, to drive the large number of blower duct switching doors, a left-right independently temperature-controlled type vehicle air conditioner and an up-down independently temperature-controlled type vehicle air conditioner includes a large number of actuators, such as those described in Japanese Laid-Open Patent Publication No. 2004-304951 and Japanese Laid-Open Patent Publication No. 2012-90510. However, a vehicle air conditioner that includes many actuators increases costs.

To reduce the number of components and the number of coupling steps, a single housing may accommodate a plurality of output mechanisms, each including a single motor and deceleration gears for decelerating and outputting the rotation of the motor. In other words, a single housing may accommodate a plurality of motors and deceleration gears for decelerating and outputting the rotation of the motors. This would reduce the number of components and the number of coupling steps.

However, the housing would be enlarged, and the central portion of the first case and the central portion of the second case would have a tendency of deforming. Further, a blower duct switching door is coupled directly or by a link mechanism to the one of the deceleration gears that outputs rotation. This applies load to such a gear. Further, a plurality of blower duct switching doors is coupled the actuator, which includes plural output mechanisms. This increases the load transmitted by the deceleration gear to the housing. In addition, the housing accommodates a plurality of motors, which are vibration generation sources. These factors may deform the housing.

Moreover, when a plurality of output mechanisms is simply accommodated in a single housing, a plurality of components forming the output mechanisms are coupled to a single housing. Thus, the motor actuator would be difficult to assemble.

SUMMARY OF THE INVENTION

A first object of the present invention is to provide a motor actuator capable of suppressing deformation of a housing accommodating a plurality of output mechanisms.

A second object of the present invention is to provide a motor actuator that may easily be assembled.

To achieve the first object, one aspect of the present invention is a motor actuator including a box-shaped housing and a plurality of output mechanisms accommodated in the housing. The housing includes a first case and a second case, which are overlapped with each other, and a fastening unit, which fastens the first case and the second case. Each of the plurality of output mechanisms includes a motor and a plurality of deceleration gears that decelerate and output rotation of the motor. The motor is supported by the housing, and a final stage deceleration gear among the plurality of deceleration gears is rotatably supported by the housing. The fastening unit is arranged in a first fastening unit formation range. The first fastening unit formation range is a range formed by connecting contours of the plurality of motors and contours of a plurality of the final stage deceleration gears as viewed from a first direction, along which a rotation axis of the final stage deceleration gear extends, and the first fastening unit formation range is a range surrounding the plurality of motors and the plurality of final stage deceleration gears.

To achieve the second object, a further aspect of the present invention is a motor actuator including a plurality of output mechanisms and a housing that accommodates the plurality of output mechanisms. Each of the plurality of output mechanisms includes a motor, a plurality of deceleration gears, a position detection sensor, a sensor signal line, and a power supplying terminal. The motor includes a motor power supplying terminal supplied with power. The plurality of deceleration gears decelerate and output rotation of the motor. The position detection sensor includes a rotation member, which is coupled to at least one of the plurality of deceleration gears and rotated integrally and coaxially with the at least one of the deceleration gears, and a sensor terminal, which contacts the rotation member and outputs a position detection signal corresponding to a rotation position of the deceleration gear. The sensor signal line transmits the position detection signal output from the sensor terminal to a control unit that controls the rotation of the motor. The power supplying terminal unit is connected to the motor power supplying terminal to supply power to the motor. The sensor signal lines of the plurality of output mechanisms are formed integrally with each other.

BRIEF DESCRIPTION OF THE DRAWINGS

The invention, together with objects and advantages thereof, may best be understood by reference to the following description of the presently preferred embodiments together with the accompanying drawings in which:

FIG. 2A is a plan view of the motor actuator of FIG. 1;

FIG. 2B is a side view of the motor actuator of FIG. 1;

FIG. 2C is a bottom view of the motor actuator of FIG. 1;

FIG. 6 is a perspective view of an engagement hook in a further form of the first fastening support;

FIG. 7 is a cross-sectional view showing a further form of the fastening unit;

FIG. 8 is a cross-sectional view showing a further form of the fastening unit;

DETAILED DESCRIPTION OF THE PREFERRED EMBODIMENTS

First Embodiment

A first embodiment of a motor actuator will now be described below with reference to FIGS. 1 to 4.

Figure 1:
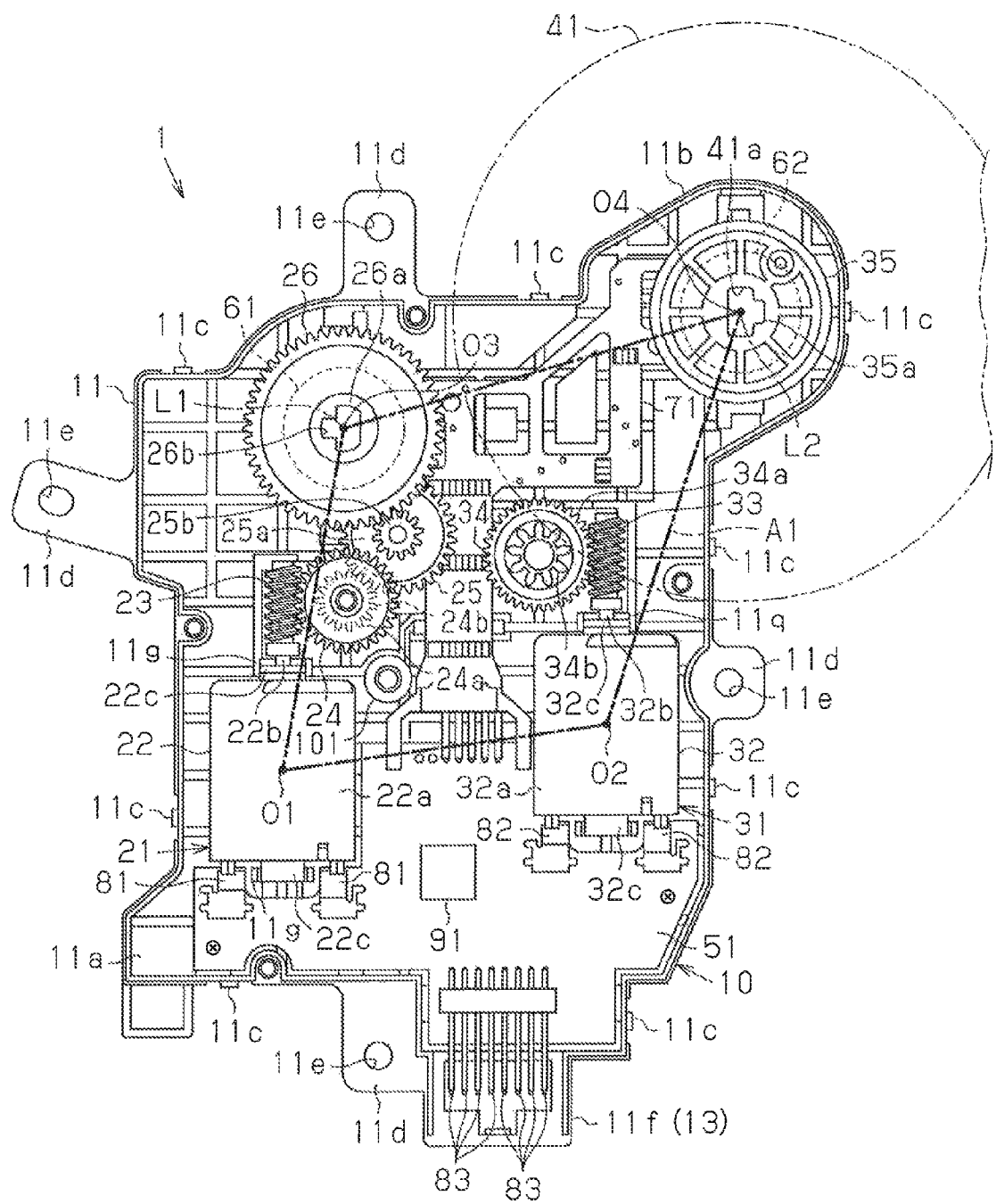
FIG. 1 is a plan view of a motor actuator, without a second case, according to a first embodiment of the present invention.

A motor actuator 1 shown in FIG. 1 is arranged in a vehicle air conditioner to drive blower duct switching doors (various dampers). The motor actuator 1 includes a housing 10, a plurality of (two in the present embodiment) output mechanisms 21, 31 (i.e., first output mechanism 21 and second output mechanism 31, or first output group 21 and second output group 31), and the like accommodated in the housing 10 to output rotation.

As shown in FIG. 2B, the housing 10 includes a first case 11 and a second case 12, which are overlapped with each other, to have the form of a hollow box. The first case 11 and the second case 12 are made from a resin material.

Figure 3:
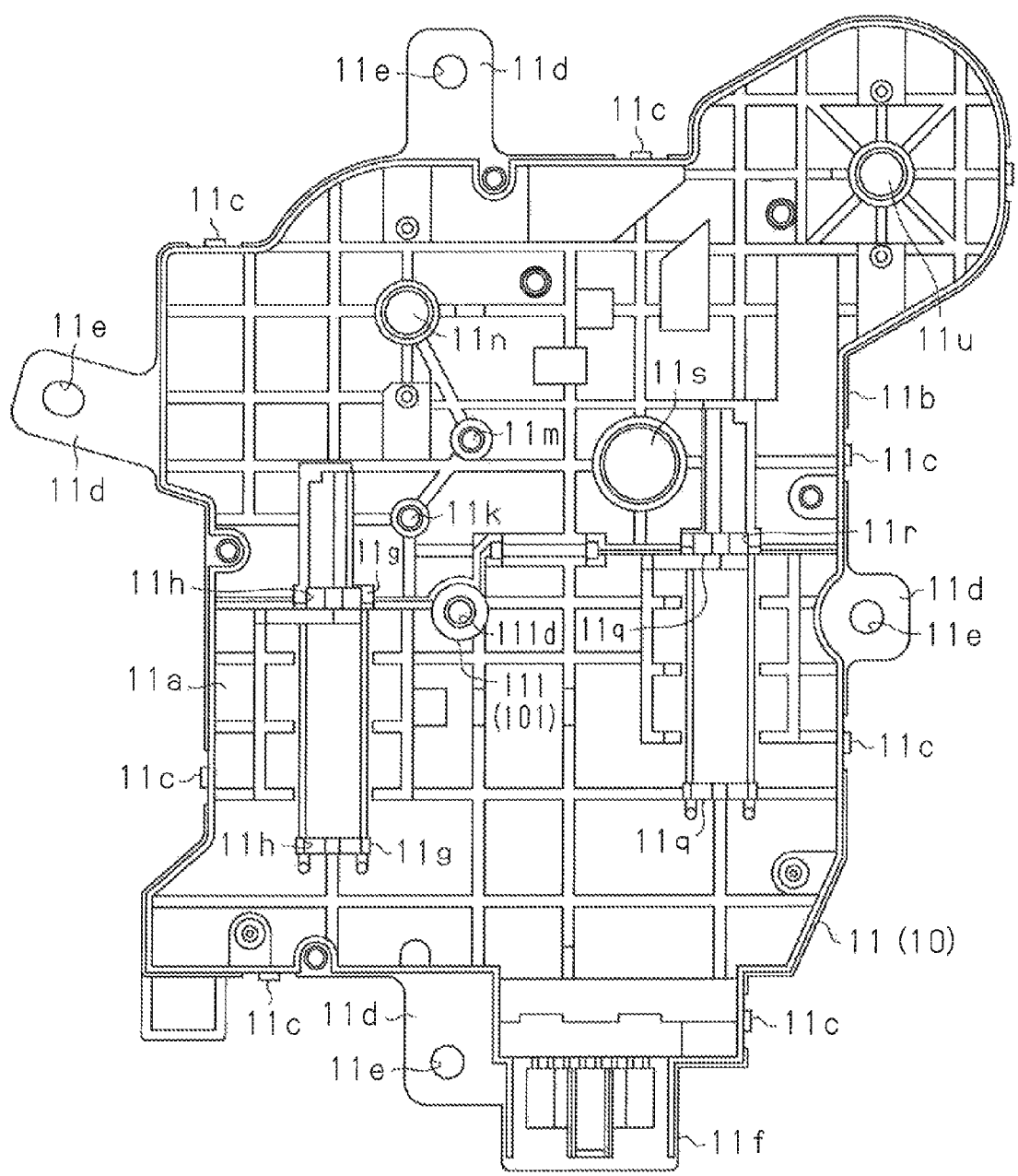
FIG. 3 is a plan view of a first case of FIG. 1.

As shown in FIGS. 2B and 2C, and FIG. 3, the first case 11 includes a bottom portion 11a, which has a substantially square plate shape, and a side wall portion 11b, which is arranged in an upright manner along an outer edge of the bottom portion 11a and is dish-shaped. A plurality of (eight in the present embodiment) engagement projections 11c projecting toward an outer side of the first case 11 is formed on an outer peripheral surface of the side wall portion 11b. The engagement projections 11c serve as an outer fastening unit. A plurality of (four in the present embodiment) first fixing portions 11d is formed at an opening of the first case 11, that is, an end on the side opposite to the bottom portion 11a of the side wall portion 11b. The first fixing portion 11d extends parallel to the bottom portion 11a from the side wall portion 11b toward the outer side of the first case 11, and has a substantially square flat plate shape. Each first fixing portion 11d includes a first insertion hole 11e that extends through the first fixing portion 11d in a thickness direction. The side wall portion 11b includes a first connector forming portion 11f projecting toward the outer side of the first case 11. The first connector forming portion 11f as viewed from a distal end side of the first connector forming portion 11f is U-shaped and opens toward the opening side of the first case 11, that is, along a direction from the bottom portion 11a of the first case 11 toward the opening of the first case 11.

As shown in FIGS. 2A and 2B, the second case 12 includes an upper bottom portion 12a, which faces the bottom portion 11a of the first case 11, and a side wall portion 12b, which is arranged in an upright manner along an outer edge of the upper bottom portion 12a, and is dish-shaped. In the first embodiment, the height of the side wall portion 12b of the second case 12 is lower than the side wall portion 11b of the first case 11 (height from the upper bottom portion 12a), and thus the second case 12 is dish-shaped and shallower than the first case 11. Engagement pieces 12c, the number of which is the same (i.e., eight) as the engagement projections 11c, are formed on an outer peripheral surface of the side wall portion 12b. The engagement pieces 12c serve as an outer fastening unit. The eight engagement pieces 12c are formed at positions facing the eight engagement projections 11c formed on the first case 11, and are extended toward the side opposite to the upper bottom portion 12a. Second fixing portions 12d, the number of which is the same (i.e., four) as the first fixing portions 11d, is formed at the opening of the first case 11, that is, an end on the side opposite to the upper bottom portion 12a of the side wall portion 12b. The four second fixing portions 12d are formed at positions facing the four first fixing portions 11d formed on the first case 11, and are extended parallel to the upper bottom portion 12a from the side wall portion 12b toward the outer side of the second case 12 to form a substantially square flat plate shape. Each second fixing portion 12d includes a second insertion hole 12e that extends through the second fixing portion 12d in the thickness direction. The side wall portion 12b includes a second connector forming portion 12f projecting to the outer side of the second case 12. The second connector forming portion 12f is formed at a position facing the first connector forming portion 11f formed in the first case 11. The second connector forming portion 12f as viewed from the distal end side of the second connector forming portion 12f is substantially U-shaped and opens toward the opening side of the second case 12, that is, along the direction from the upper bottom portion 12a of the second case 12 toward the opening of the second case 12.

As shown in FIG. 2B, the first case 11 and the second case 12 are overlapped with openings facing each other. A distal end of the side wall portion 11b of the first case 11 and a distal end of the side wall portion 12b of the second case 12 are brought into contact thus closing the opening of the first case 11 with the second case 12. The eight engagement pieces 12c of the second case 12 are snap-fitted and engaged with the eight engagement projections 11c of the first case 11, so that the first case 11 and the second case 12 are fastened and fixed, and integrated by the engagement projections 11c and the engagement pieces 12c. In the first embodiment, the engagement projections 11c and the engagement pieces 12c, which are snap-fitted and engaged with each other, form the outer fastening unit. Furthermore, when the first case 11 and the second case 12 are overlapped, the first connector forming portion 11f and the second connector forming portion 12f are overlapped with the openings facing each other to form a connector unit 13 of a square tube shape. The distal end of the connector unit 13 includes a rectangular opening opened toward the outer side of the housing 10. The first fixing portion 11d and the second fixing portion 12d are overlapped, and the first insertion hole 11e and the second insertion hole 12e are overlapped. The motor actuator 1 is fixed to the vehicle by inserting and tightening a screw (not shown) to the first insertion hole 11e and the second insertion hole 12e of the first fixing portion 11d and the second fixing portion 12d overlapped with each other.

As shown in FIG. 1, the first output mechanism 21 includes a motor 22, a worm 23, a first deceleration gear 24, a second deceleration gear 25, and an output gear 26. The worm 23, the first deceleration gear 24, the second deceleration gear 25, and the output gear 26 are formed such that at least one part is arranged inside the housing 10 to be transmitted with the rotation of the motor 22, and are all deceleration gears for decelerating and outputting the rotation of the motor 22.

The motor 22 includes a cylindrical housing case 22a which ends are closed. A rotation shaft 22b of the motor 22 projects from a middle of a first end face in the axial direction of the housing case 22a, and a pair of motor power supplying terminals (not shown) for supplying power to the motor 22 is arranged at a second end face in the axial direction of the housing case 22a. The motor 22 rotates the rotation shaft 22b when supplied with power from the motor power supplying terminals. A supporting protrusion 22c that projects in the axial direction of the housing case 22a is formed at the central part of the end faces in the axial direction of the housing case 22a.

As shown in FIGS. 1 and 3, a pair of motor supporting portions 11g for supporting the motor 22 is integrally formed with the bottom portion 11a at the bottom portion 11a of the first case 11 inside the housing 10. The pair of motor supporting portions 11g are arranged in an upright manner on the bottom portion 11a of the first case 11 as to form a right angle with the bottom portion 11a. The motor supporting portions 11g forming a pair are spaced apart by a distance substantially equal to the distance between the end faces in the axial direction of the housing case 22a. A supporting recess 11h is arranged in a recessed manner from the distal end toward the basal end at the distal end of each motor supporting portion 11g. The motor 22 is supported by the motor supporting portions 11g by inserting the supporting protrusions 22c arranged at both ends in the axial direction of the housing case 22a to the supporting recesses 11h of the pair of motor supporting portions 11g with the housing case 22a arranged between the pair of motor supporting portions 11g. In other words, the motor 22 is supported by the housing 10. The pair of motor supporting portions 11g supports the motor 22 while restricting movement in the axial direction and movement in the radial direction of the motor 22.

The worm 23 is attached to the rotation shaft 22b of the motor 22 so as to be integrally rotatable with the rotation shaft 22b. The first deceleration gear 24 is arranged in the vicinity of the worm 23 inside the housing 10. The first deceleration gear 24 includes a first large diameter gear 24a having a circular plate shape, and a first small diameter gear 24b integrally formed with the first large diameter gear 24a. The first small diameter gear 24b has a circular plate shape which the diameter is smaller than the first large diameter gear 24a, and is integrally formed so as to be coaxial with the first large diameter gear 24a at one end face in the axial direction of the first large diameter gear 24a. A first shaft supporting portion 11k is arranged in the vicinity of the worm 23 inside the housing 10. The first shaft supporting portion 11k extends from the bottom portion 11a of the first case 11 so as to be perpendicular to the bottom portion 11a, and is cylindrical. The first deceleration gear 24 is rotatably supported by the first shaft supporting portion 11k by inserting the first shaft supporting portion 11k to the central part in the radial direction (i.e., central part in the radial direction of the first large diameter gear 24a and the first small diameter gear 24b). In other words, the first deceleration gear 24 is rotatably supported by the housing 10 including the first shaft supporting portion 11k. The first deceleration gear 24 is externally inserted to the first shaft supporting portion 11k such that the first small diameter gear 24b is arranged between the first large diameter gear 24a and the bottom portion 11a of the first case 11. The first large diameter gear 24a of the first deceleration gear 24 axially supported by the first shaft supporting portion 11k is engaged with the worm 23.

The second deceleration gear 25 is arranged in the vicinity of the first deceleration gear 24 inside the housing 10. The second deceleration gear 25 includes a second large diameter gear 25a having a circular plate shape, and a second small diameter gear 25b integrally formed with the second large diameter gear 25a. The second small diameter gear 25b has a circular plate shape in which the diameter is smaller than the second large diameter gear 25a, and is formed integrally and coaxially with the second large diameter gear 25a at one end face in the axial direction of the second large diameter gear 25a.

A second shaft supporting portion 11m is arranged in the vicinity of the first shaft supporting portion 11k inside the housing 10. The second shaft supporting portion 11m extends from the bottom portion 11a of the first case 11 so as to be perpendicular to the bottom portion 11a and is cylindrical. The second deceleration gear 25 is rotatably supported by the second shaft supporting portion 11m by inserting the second shaft supporting portion 11m into the central part in the radial direction (i.e., central part in the radial direction of the second large diameter gear 25a and the second small diameter gear 25b). In other words, the second deceleration gear 25 is rotatably supported by the housing 10 including the second shaft supporting portion 11m. The second deceleration gear 25 is externally inserted to the second shaft supporting portion 11m such that the second large diameter gear 25a is arranged between the second small diameter gear 25b and the bottom portion 11a of the first case 11. The second large diameter gear 25a of the second deceleration gear 25 axially supported by the second shaft supporting portion 11m is engaged with the first small diameter gear 24b of the first deceleration gear 24.

The output gear 26 is arranged in the vicinity of the second deceleration gear 25 inside the housing 10. The output gear 26 has a substantially circular plate shape, and includes an output shaft portion 26a at a central part in the radial direction. The output shaft portion 26a is cylindrical extending along a rotation axis L1 of the output gear 26, and includes a coupling recess 26b at a distal end face. The coupling recess 26b has the shape as viewed from the direction in which the rotation axis L1 of the output gear 26 extends formed to a substantially T-shape.

A third shaft supporting portion 11n is arranged in the vicinity of the second shaft supporting portion 11m inside the housing 10. The third shaft supporting portion 11n extends from the bottom portion 11a of the first case 11 so as to be perpendicular to the bottom portion 11a, and is cylindrical. The output gear 26 is rotatably supported by the third shaft supporting portion 11n by inserting the third shaft supporting portion 11n into the central part in the radial direction of the output gear 26. In other words, the output gear 26 is rotatably supported by the housing 10 including the third shaft supporting portion 11n. The output gear 26 is externally inserted to the third shaft supporting portion 11n with the output shaft portion 26a facing the side opposite to the bottom portion 11a of the first case 11. The output gear 26 axially supported by the third shaft supporting portion 11n is engaged with the second small diameter gear 25b of the second deceleration gear 25. As shown in FIGS. 2A and 2B, the output shaft portion 26a projects to the exterior of the housing 10 from a first output hole 11p formed at a portion facing in the axial direction of the output gear 26 with the output gear 26 in the upper bottom portion 12a of the second case 12. The link mechanism (not shown) for activating the blower duct switching door is coupled to the distal end of the output shaft portion 26a projecting to the exterior of the housing 10. In other words, the output shaft portion 26a is coupled to the blower duct switching door by way of the link mechanism. The link mechanism coupled to the output shaft portion 26a includes a substantially T-shaped protrusion corresponding to the coupling recess 26b, and is coupled in a relatively non-rotatable manner with respect to the output shaft portion 26a by inserting the protrusion to the coupling recess 26b.

As shown in FIG. 1, in the first output mechanism 21, the rotation of the rotation shaft 22b is transmitted to the worm 23 when the motor 22 is activated. The rotation transmitted to the worm 23 is transmitted while being decelerated in the order of the first deceleration gear 24, the second deceleration gear 25, and the output gear 26. The rotation transmitted to the output gear 26 is output from the output shaft portion 26a, and the blower duct switching door is driven through the link mechanism coupled to the output shaft portion 26a.

The second output mechanism 31 includes a motor 32, a worm 33, an output gear 34, and a sensor output shaft portion 35. The worm 33, the output gear 34, and the sensor output shaft portion 35 are formed such that they all have at least one part arranged inside the housing 10 so as to be transmitted with the rotation of the motor 32, and are all deceleration gears for decelerating and outputting the rotation of the motor 32.

The motor 32 has the same shape as the motor 22 forming the first output mechanism 21. In other words, the motor 32 has a cylindrical housing case 32a which ends are closed. A rotation shaft 32b of the motor 32 projects from a middle of a first end face in the axial direction of the housing case 32a, and a pair of motor power supplying terminals (not shown) for supplying power to the motor 32 is arranged at a second end face in the axial direction of the housing case 32a. The motor 32 rotates the rotation shaft 32b when supplied with power from the motor power supplying terminals. A supporting protrusion 32c that projects in the axial direction of the housing case 32a is formed at central parts of the end faces in the axial direction of the housing case 32a.

As shown in FIGS. 1 and 3, a pair of motor supporting portions 11q for supporting the motor 32 is integrally formed with the bottom portion 11a at the bottom portion 11a of the first case 11 inside the housing 10. The motor supporting portion 11q has a similar shape as the motor supporting portion 11g. In other words, the two motor supporting portions 11q are arranged in an upright manner on the bottom portion 11a of the first case 11 so as to form a right angle with the bottom portion 11a. The motor supporting portions 11q that form a pair are spaced apart by a distance substantially equal to the distance between the end faces in the axial direction of the housing case 32a. A supporting recess 11r is arranged in a recessed manner from the distal end toward the basal end at the distal end of each motor supporting portion 11q. The motor 32 is supported by the motor supporting portions 11q by inserting the supporting protrusion 32c arranged at both ends in the axial direction of the housing case 32a to the supporting recesses 11r of the pair of motor supporting portions 11q with the housing case 32a arranged between the pair of motor supporting portions 11q. In other words, the motor 32 is supported by the housing 10. The pair of motor supporting portions 11q supports the motor 22 while restricting movement in the axial direction and movement in the radial direction of the motor 32.

The worm 33 is attached to the rotation shaft 32b of the motor 32 so as to be integrally rotatable with the rotation shaft 32b. The output gear 34 is arranged in the vicinity of the worm 33 inside the housing 10. The output gear 34 includes a large diameter gear 34a having a circular plate shape, and a small diameter gear 34b integrally formed with the large diameter gear 34a. The small diameter gear 34b has a circular plate shape in which the diameter is smaller than the large diameter gear 34a, and is integrally formed at one end face in the axial direction of the large diameter gear 34a so as to be coaxial with the large diameter gear 34a.

A fourth shaft supporting portion 11s is arranged in the vicinity of the worm 33 inside the housing 10. The fourth shaft supporting portion 11s extends from the bottom portion 11a of the first case 11 so as to be perpendicular to the bottom portion 11a, and is cylindrical. The output gear 34 is rotatably supported by the fourth shaft supporting portion 11s by inserting the fourth shaft supporting portion 11s to the central part in the radial direction of the output gear 34 (i.e., central part in the radial direction of the large diameter gear 34a and the small diameter gear 34b). In other words, the output gear 34 is rotatably supported by the housing 10 including the fourth shaft supporting portion 11s. The output gear 34 is externally inserted to the fourth shaft supporting portion 11s such that the large diameter gear 34a is arranged between the small diameter gear 34b and the bottom portion 11a of the first case 11. The large diameter gear 34a of the output gear 34 axially supported by the fourth shaft supporting portion 11s is engaged with the worm 23. Furthermore, as shown in FIGS. 2A and 2B, the small diameter gear 34b of the output gear 34 projects to the exterior of the housing 10 from a second output hole 11t formed at a portion facing the output gear 34 in the axial direction of the output gear 34 at the upper bottom portion 12a of the second case 12.

As shown in FIG. 1, the sensor output shaft portion 35 is arranged at a position spaced apart from the output gear 34 inside the housing 10. The sensor output shaft portion 35 has a substantially circular plate shape, and includes a coupling shaft 35a at a central part in the radial direction thereof. The coupling shaft 35a has the form of a substantially T-shaped rod as viewed from the direction in which a rotation axis L2 of the sensor output shaft portion 35 extends.

As shown in FIG. 3, a fifth shaft supporting portion 11u is arranged at a position spaced apart from the fourth shaft supporting portion 11s inside the housing 10. The fifth shaft supporting portion 11u extends from the bottom portion 11a of the first case 11 so as to be perpendicular with respect to the bottom portion 11a, and is cylindrical. As shown in FIGS. 1 and 3, the sensor output shaft portion 35 is rotatably supported by the fifth shaft supporting portion 11u by inserting the fifth shaft supporting portion 11u into the central part in the radial direction thereof. In other words, the sensor output shaft portion 35 is rotatably supported by the housing 10 including the fifth shaft supporting portion 11u. The sensor output shaft portion 35 is externally fitted to the fifth shaft supporting portion 11u with the distal end of the coupling shaft 35a facing the side opposite to the bottom portion 11a of the first case 11. The rotation axis L2 of the sensor output shaft portion 35 is parallel to the rotation axis L1 of the output gear 26 of the first output mechanism 21.

As shown in FIGS. 2A and 2B, the sensor output shaft portion 35 axially supported by the fifth shaft supporting portion 11u is exposed to the exterior of the housing 10 from a third output hole 11w formed at a portion facing the sensor output shaft portion 35 at the upper bottom portion 12a of the second case 12. The third output hole 11w has a circular shape substantially equal to the outer diameter of the sensor output shaft portion 35. The coupling shaft 35a is exposed to the exterior of the housing 10 from the third output hole 11w. As shown in FIG. 1, a link member 41 forming the link mechanism for activating the blower duct switching door is coupled to the coupling shaft 35a projecting to the exterior of the housing 10. The link member 41 has a circular gear shape. A coupling hole 41a in which the shape as viewed from the axial direction of the link member 41 is a substantially T-shape corresponding to the outer diameter shape of the coupling shaft 35a is formed at a central part in the radial direction of the link member 41. The link member 41 is coupled in an integrally rotatable manner to the sensor output shaft portion 35 by inserting the coupling shaft 35a to the coupling hole 41a. The link member 41 coupled to the sensor output shaft portion 35 is arranged exterior to the housing 10, and is engaged with the small diameter gear 34b of the output gear 34 at the exterior of the housing 10. In other words, the output gear 34 is coupled to the blower duct switching door by way of the link mechanism including the link member 41.

In the second output mechanism 21 described above, the rotation of the rotation shaft 32b is transmitted to the worm 33 when the motor 32 is activated. The rotation transmitted to the worm 33 is output from the small diameter gear 34b of the output gear 34. The link member 41 engaged with the small diameter gear 34b of the output gear 34 is then rotated, and the blower duct switching door is driven by the link mechanism including the link member 41. In this case, the link member 41 integrally rotates with the sensor output shaft portion 35 while being supported by the sensor output shaft portion 35. Therefore, the rotation of the motor 32 transmitted to the output gear 34 is transmitted to the sensor output shaft portion 35 through the link member 41. In the second output mechanism 31, the deceleration gear of the final stage corresponds to the sensor output shaft portion 35, which is the last component rotatably supported by the housing 10 and to which the rotation of the motor 32 is transmitted.

A circuit substrate 51 is accommodated in the housing 10. The circuit substrate 51 has a flat plate shape smaller than the bottom portion 11a of the first case 11. The circuit substrate 51 is arranged at a portion between the motor 22 and the motor 32, and the connector unit 13 in the bottom portion 11a of the first case 11, and fixed to the bottom portion 11a.

A first position detection sensor 61 for detecting the rotation position of the output gear 26 is attached to the output gear 26 of the first output mechanism 21. The first position detection sensor 61 has a circular ring shape, and is arranged at a portion closer to the bottom portion 11a of the first case 11 in the output gear 26 to integrally rotate with the output gear 26. A second position detection sensor 62 for detecting the rotation position of the output gear 34 engaged with the link member 41 that integrally rotates with the sensor output shaft portion 35 is attached to the sensor output shaft portion 35 of the second output mechanism 31. The second position detection sensor 62 has a circular ring shape, and is arranged at a portion closer to the bottom portion 11a of the first case 11 in the sensor output shaft portion 35 to integrally rotate with the sensor output shaft portion 35. The first position detection sensor 61 and the second position detection sensor 62 are electrically connected to the circuit substrate 51 by a bus bar member 71 arranged on the bottom portion 11a of the first case 11 inside the housing 10. The first position detection sensor 61 and the second position detection sensor 62 output electric signals corresponding to the rotation position through the bus bar member 71.

The circuit substrate 51 includes a pair of power supplying terminals 81 for supplying power to the motor 22 and a pair of power supplying terminals 82 for supplying power to the motor 32. The pair of power supplying terminals 81 are arranged near an end in an axial direction on the side opposite to an end where the rotation shaft 22b projects in the motor 22, and are pressed against motor power supplying terminals of the motor 22 to be electrically connected to the motor power supplying terminals. In the same manner, the pair of power supplying terminals 82 are arranged near an end in an axial direction on the side opposite to an end where the rotation shaft 32b projects in the motor 32, and are pressed against motor power supplying terminals of the motor 32 to be electrically connected to the motor power supplying terminals.

A plurality of connector terminals 83 for carrying out power supply to the motor actuator 1, exchange of electric signals with an external device (not shown) mounted on the vehicle, and the like are connected to the circuit substrate 51. The plurality of connector terminals 83 each projects into the interior of the connector unit 13. The plurality of connector terminals 83 are electrically connected with an external connector (not shown) inserted to the connector unit 13. The power supply to the motor actuator 1, the exchange of electric signals with the external device mounted on the vehicle, and the like are carried out through the external connector.

Furthermore, a drive IC 91 for performing the control of the motor actuator 1 is mounted on the circuit substrate 51. The drive IC 91 controls the power supply to the motor 22 and the motor 32 based on the electric signal input from the external device through the external connector, as well as the electric signals input from the first position detection sensor 61 and the second position detection sensor 62.

As shown in FIGS. 1 and 2A, the housing 10 of the motor actuator 1 of the first embodiment includes a fastening unit 101 for fastening the first case 11 and the second case 12 inside the housing 10. The fastening unit 101 includes, in a fastening unit formation range A1 formed by connecting a center of gravity O1 of the motor 22 of the first output mechanism 21, a center of gravity O2 of the motor 32 of the second output mechanism 31, a rotation center O4 of the sensor output shaft portion 35 of the final stage in the second output mechanism 31, and a rotation center O3 of the output gear 26 of the final stage in the first output mechanism 21 as viewed from the direction in which the rotation axis L1 of the output gear 26 of the final stage extends in the first output mechanism 21 (same as the direction in which the rotation axis L2 of the sensor output shaft portion 35 of the final stage extends in the second output mechanism 31). In FIG. 1, the fastening unit formation range A1 (fourth fastening unit formation range) is a portion surrounded by single-dashed line, and is formed to have a square shape. The fastening unit 101 of the first embodiment is formed at a position closer to the middle of the bottom portion 11a of the first case 11 than the motor 22 between the motor 22 and the motor 32 within the fastening unit formation range A1. The fastening unit 101 is formed in the vicinity of the first deceleration gear 24 and in the vicinity of the end in the axial direction where the rotation shaft 22b projects in the housing case 22a of the motor 22.

Figure 4:
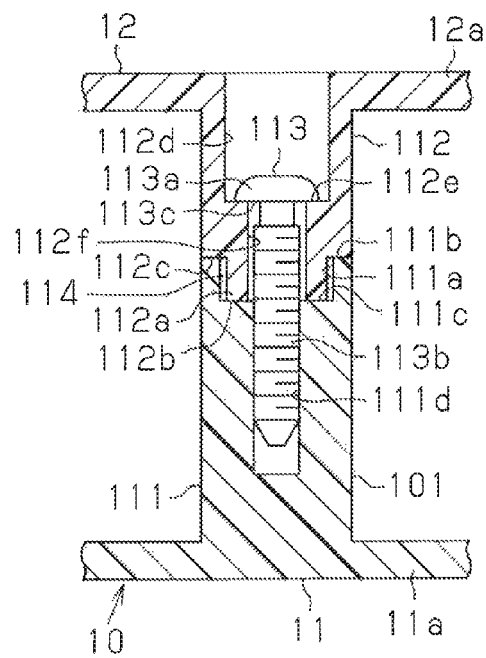
FIG. 4 is a cross-sectional view of a fastening unit of FIG. 1.

As shown in FIG. 4, the fastening unit 101 includes a first fastening support 111 arranged in the first case 11, a second fastening support 112 arranged in the second case 12, and a fastening screw 113 for coupling the first fastening support 111 and the second fastening support 112.

The first fastening support 111 projects into the first case 11 from the bottom portion 11a of the first case 11, and is integrally formed with the bottom portion 11a. The first fastening support 111 is cylindrical and extends so as to be orthogonal to the bottom portion 11a of the first case 11. A seat recess 111a is arranged in a recessed manner at the distal end of the first fastening support 111. The seat recess 111a is arranged at a central part in the radial direction of the first fastening support 111 at the distal end of the first fastening support 111, and is arranged in a recessed manner in the axial direction of the first fastening support 111 from the distal end face of the first fastening support 111 toward the basal end of the first fastening support 111. The seat recess 111a has a shape as viewed from the distal end of the first fastening support 111 that is circular. The distal end of the first fastening support 111 has a shape including a step difference by forming the seat recess 111a.

The distal end face of the first fastening support 111 becomes a first receiving surface 111b of a planar shape that is orthogonal to the axial direction of the first fastening support 111, or parallel to the bottom portion 11a of the first case 11. The first receiving surface 111b is formed to have a circular ring shape that surrounds the periphery of the opening of the seat recess 111a. The bottom surface of the seat recess 111a becomes a second receiving surface 111c of a planar shape that is parallel to the first receiving surface 111b.

The first fastening support 111 includes a threaded hole 111d arranged in a recessed manner at a basal end side of the first fastening support 111 along the axial direction of the first fastening support 111 from the bottom surface (i.e., second receiving surface 111c) of the seat recess 111a. The threaded hole 111d is formed at a central part in the radial direction of the first fastening support 111 and has a female screw formed on an inner circumferential surface.

The second fastening support 112 projects into the second case 12 (inner side of the housing 10) from a position facing the first fastening support in the upper bottom portion 12a of the second case 12, and is integrally formed with the bottom portion 12a. In other words, the first fastening support 111 and the second fastening support 112 project in the opposing direction of the first case 11 and the second case 12 so as to approach each other inside the housing 10. The second fastening support 112 has a substantially cylindrical shape extending so as to be orthogonal to the upper bottom portion 12a of the second case 12. The outer diameter (largest diameter) of the second fastening support 112 is equal to the outer diameter of the first fastening support 111.

The distal end of the second fastening support 112 includes an insertion portion 112a in which the outer diameter is smaller than the basal end of the second fastening support 112. The outer diameter of the insertion portion 112a is slightly smaller than the inner diameter of the seat recess 111a. The distal end of the second fastening support 112 includes a step difference by arranging the insertion portion 112a.

The distal end face of the insertion portion 112a (same as the distal end face of the second fastening support 112) becomes a first contacting surface 112b with a planar shape that is orthogonal to the axial direction of the second fastening support 112, that is, parallel to the upper bottom portion 12a of the second case 12. In the second fastening support 112, a second contacting surface 112c adjacent in the radial direction with the basal end of the insertion portion 112a is formed at the periphery of the basal end of the insertion portion 112a. The second contacting surface 112c is planar and parallel to the first contacting surface 112b, and has a circular ring shape that surrounds the basal end of the insertion portion 112a. The axial length of the insertion portion 112a, that is, the distance between the first contacting surface 112b and the second contacting surface 112c is equal to the depth (axial depth) of the seat recess 111a, that is, the distance between the first receiving surface 111b and the second receiving surface 111c.

An accommodation recess 112d is formed at a portion of the basal end of the second fastening support 112. The accommodation recess 112d is extended through the upper bottom portion 12a of the second case 12 and opened to the exterior of the housing 10. In other words, the accommodation recess 112d is arranged in a recessed manner in the axial direction of the second fastening support 112 from the outer surface of the upper bottom portion 12a of the second case 12 toward the distal end of the second fastening support 112. The accommodation recess 112d is formed at a central part in the radial direction of the second fastening support 112, and a shape as viewed from the axial direction of the second fastening support 112 is a circular shape. The inner diameter of the accommodation recess 112d is greater than the outer diameter of a head 113a of the fastening screw 113. Furthermore, a depth (axial depth) of the accommodation recess 112d is deeper than a thickness (axial length) of the head 113a. The bottom surface of the accommodation recess 112d forms a screw receiving surface 112e that is planar and orthogonal to the axial direction of the second fastening support 112, or parallel to the first contacting surface 112b and the second contacting surface 112c.

The second fastening support 112 includes a through hole 112f that extends in the axial direction of the second fastening support 112 between the bottom surface (i.e., screw receiving surface 112e) of the accommodation recess 112d and the distal end of the second fastening support 112. The through hole 112f has a cross-sectional shape in a direction orthogonal to the axial direction of the second fastening support 112 formed to a circular shape, and the inner diameter is smaller than the inner diameter of the accommodation recess 112d and greater than the outer diameter of a screw portion 113b in which a male screw is formed at the outer peripheral surface in the fastening screw 113. The through hole 112f is formed at a central part in the radial direction of the second fastening support 112, and is communicated to the accommodation recess 112d and opened to the central part in the radial direction of the first contacting surface 112b.

As shown in FIGS. 2B and 4, in the first fastening support 111 and the second fastening support 112 formed as above, the insertion portion 112a of the second fastening support 112 is inserted to the seat recess 111a of the first fastening support 111 when overlapping the first case 11 and the second case 12 and snap-fitting and engaging the engagement piece 12c with the engagement projection 11c. The second contacting surface 112c contacts the first receiving surface 111b and the first contacting surface 112b contacts the second receiving surface 111c from the opposing direction of the bottom portion 11a and the upper bottom portion 12a (same as the opposing direction of the first fastening support 111 and the second fastening support 112). In other words, the second fastening support 112 contacts the first fastening support 111 from a recess direction of the threaded hole 111d. Furthermore, the accommodation recess 112d and the threaded hole 111d are communicated through the through hole 112f. In other words, the through hole 112f communicates the threaded hole 111d and the exterior of the housing 10 through the accommodation recess 112d. The first fastening support 111 and the second fastening support 112 in this state are fastened with the fastening screw 113. The fastening screw 113 has the screw portion 113b extended through the accommodation recess 112d and the through hole 112f and joined in the threaded hole 111d, and is fastened until a seat surface 113c of the head 113a contacts the screw receiving surface 112e. Since the depth of the accommodation recess 112d is deeper than the thickness of the head 113a, the head 113a in which the seat surface 113c is brought into contact with the screw receiving surface 112e, which is the bottom surface of the accommodation recess 112d, is completely arranged inside the accommodation recess 112d, and does not project to the outer side of the housing 10 than the outer surface of the first case 11.

The first fastening support 111, the second fastening support 112, and the fastening screw 113 fasten the first case 11 and the second case 12 at the inner side (inside) the housing 10, and support the bottom portion 11a of the first case 11 and the upper bottom portion 12a of the second case 12. In the first fastening support 111 and the second fastening support 112 fastened by the fastening screw 113, the second contacting surface 112c is pushed against the first receiving surface 111b and the first contacting surface 112b is pushed against the second receiving surface 111c. The first fastening support 111 and the second fastening support 112 are coupled by engaging the step difference between the first receiving surface 111b and the second receiving surface 111c with the step difference between the first contacting surface 112b and the second contacting surface 112c. Thus, a labyrinth structure portion 114 forming a labyrinth structure is formed between the distal end of the first fastening support 111 and the distal end of the second fastening support 112 at a portion where the distal end of the first fastening support 111 and the distal end of the second fastening support 112 overlap in the radial direction. The labyrinth structure portion 114 forms a step difference in a passage from the inner side of the second fastening support 112 to the outer side of the first fastening support 111 and the second fastening support 112 (i.e., internal space of the housing 10) passing between the first fastening support 111 and the second fastening support 112 (gearing section), thus complicating the shape of the passage.

The operation of the motor actuator 1 of the first embodiment will now be described.

Since a plurality of (two in the present embodiment) output mechanisms 21, 31 is accommodated in the housing 10, a plurality of motors 22, 32 and a plurality of deceleration gears of the final stage (i.e., the output gear 26 and the sensor output shaft portion 35) are accommodated. The fastening unit formation range A1 is a range formed by connecting the center of gravity O1 of the motor 22, the center of gravity O2 of the motor 32, the rotation center O4 of the sensor output shaft portion 35, and the rotation center O3 of the output gear 26 of the final stage. The position where force acts on the housing 10 from each motor 22, 32 is near the center of gravity O1 of the motor 22 and the center of gravity O2 of the motor 32. Furthermore, the position where force acts on the housing 10 from the output gear 26 of the final stage and the sensor output shaft portion 35 of the final stage rotatably supported by the housing 10 is near the rotation center O3 of the output gear 26 and near the rotation center O4 of the sensor output shaft portion 35. Therefore, in the motor actuator 1 including the plurality of output mechanisms 21, 31, the fastening unit 101 can be brought close to the position where force acts on the housing 10 from each motor 22, 32, and the position where force acts on the housing 10 from the output gear 26 of the final stage and the sensor output shaft portion 35 of the final stage by arranging the fastening unit 101 within the fastening unit formation range A1.

The first embodiment has the advantages described below.

(1) The fastening unit formation range A1 is a range formed by connecting the center of gravity O1 of the motor 22, the center of gravity O2 of the motor 32, the rotation center O4 of the sensor output shaft portion 35, and the rotation center O3 of the output gear 26. The position where the force acts on the housing 10 from each motor 22, 32 is near the center of gravity O1, O2 of each motor 22, 32. Furthermore, the position where the force acts on the housing 10 from each deceleration gear of the final stage rotatably supported by the housing 10 is near the rotation center O3, O4 of each deceleration gear of the final stage (i.e., the output gear 26 and the sensor output shaft portion 35). The fastening unit 101 is brought close to the portion where the force acts on the housing 10 from each motor 22, 32 and the position where the force acts on the housing 10 from the output gear 26 of final stage and the sensor output shaft portion 35 of final stage by arranging the fastening unit 101 within the fastening unit formation range A1. Therefore, the housing 10 is further suppressed by the fastening unit 101 from deforming by the force acting on the housing 10 from each motor 22, 32 and the force acting on the housing 10 from the output gear 26 of the final stage and the sensor output shaft portion 35 of the final stage. As a result, the deformation of the housing 10 accommodating the plurality of output mechanisms 21, 31 is further suppressed. Although the force acting on the housing 10 from each motor 22, 32 is smaller than the force acting on the housing 10 from the output gear 26 of the final stage and the sensor output shaft portion 35 of the final stage, the force acting on the housing 10 from each motor 22, 32 also becomes a cause of deformation of the housing 10 if the motor actuator 1 is actually activated. Thus, arranging the fastening unit 101 within the fastening unit formation range A1 is more effective in suppressing the deformation of the housing 10. If the deformation of the housing 10 is suppressed, the housing 10 is suppressed from vibrating by the vibration of the motor 22, 32 even with the housing 10 accommodating the plurality of motors 22, 32. Therefore, noise caused by the deformation of the housing 10 is suppressed.

(2) The deformation of the housing 10 is further suppressed by fastening the first case 11 and the second case 12 with the engagement projection 11c and the engagement piece 12c at the periphery of the housing 10.

(3) The first fastening support 111 and the second fastening support 112 contact the threaded hole 111d in the recess direction to form the seat of the fastening screw 113. Therefore, after the first fastening support 111 and the second fastening support 112 are fastened with the fastening screw 113, the first case 11 and the second case 12 are suppressed from expanding or depressing. In other words, the deformation of the housing 10 is further suppressed.

(4) The head 113a of the fastening screw 113 is suppressed from projecting out more than the outer surface of the housing 10 since the head 113a is accommodated in the accommodation recess 112d. Therefore, the head 113a of the fastening screw 113 is suppressed from getting caught at the components, and the like arranged at the periphery of the motor actuator 1.

(5) Liquid such as water is suppressed from entering inside of the housing 10 from the inner side of the second fastening support 112 by the labyrinth structure portion 114.

(6) In the fastening unit 101, the first receiving surface 111b and the second contacting surface 112c are in contact, and the second receiving surface 111c and the first contacting surface 112b contact in the opposing direction of the bottom portion 11a and the upper bottom portion 12a (same as the opposing direction of the first fastening support 111 and the second fastening support 112). Therefore, the first fastening support 111 and the second fastening support 112 are less likely to deform so as to tilt with respect to the opposing direction of the bottom portion 11a and the upper bottom portion 12a. Therefore, the fastening unit 101 is suppressed from deforming, and the deformation of the housing 10 is further suppressed.

The first embodiment may be modified as below.

The fastening unit 101 does not necessarily have to include the labyrinth structure portion 114.

The fastening unit 101 does not necessarily have to include the accommodation recess 112d.

In the fastening unit 101 of the first embodiment, the first receiving surface 111b and the second contacting surface 112c are brought into contact, and the second receiving surface 111c and the first contacting surface 112b are brought into contact. However, the fastening unit 101 may be formed such that only the first receiving surface 111b and the second contacting surface 112c are brought into contact. The fastening unit 101 may also be formed such that only the second receiving surface 111c and the first contacting surface 112b are brought into contact. The fastening unit 101 may also be formed such that the first fastening support 111 and the second fastening support 112 do not contact in the opposing direction of the bottom portion 11a and the upper bottom portion 12a.

In the embodiment described above, the first case 11 includes the engagement projection 11c and the second case 12 includes the engagement piece 12c. However, the first case 11 may include the engagement piece 12c and the second case 12 may include the engagement projection 11c.

In the first embodiment described above, the engagement projection 11c and the engagement piece 12c, which are snap-fitted and engaged, are arranged on the outer surface of the housing 10 as the outer fastening unit. However, the configuration of the outer fastening unit is not limited thereto. For example, the outer fastening unit for fastening the first case 11 and the second case 12 with a screw may be arranged on the outer surface of the housing 10.

In the fastening unit 101 of the embodiment described above, the first fastening support 111 is formed on the first case 11, and the second fastening support 112 is formed on the second case 12. However, the first fastening support 111 may be formed on the second case 12 and the second fastening support 112 may be formed on the first case 11.

The shape of the fastening unit 101 for fastening the first case 11 and the second case 12 inside the housing 10 is not limited to the shape of the first embodiment. For example, a fastening unit 120 shown in FIG. 5A may be arranged inside the housing 10 in place of the fastening unit 101 of the first embodiment. The fastening unit 120 includes a first fastening support 121 arranged on the first case 11 and a second fastening support 122 arranged on the second case 12.

Figure 5A:
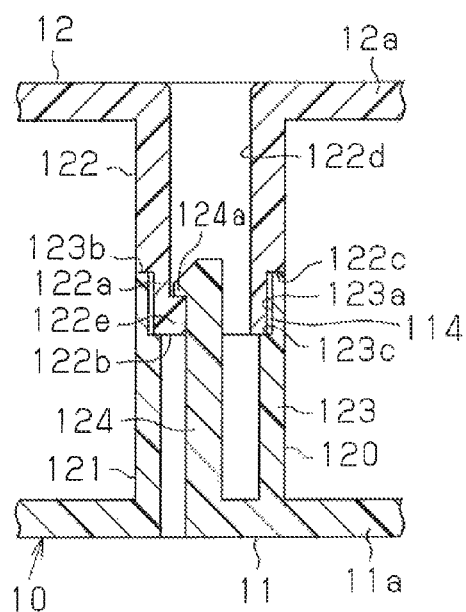
FIG. 5A is a cross-sectional view showing another form of the fastening unit.
Figure 5B:
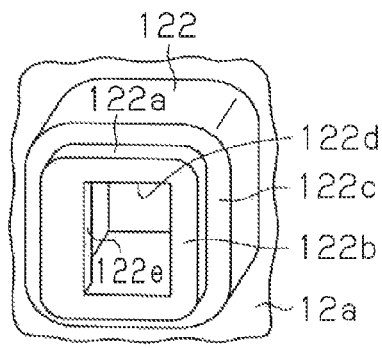
FIG. 5B is a perspective view of a second fastening support of FIG. 5A.
Figure 5C:
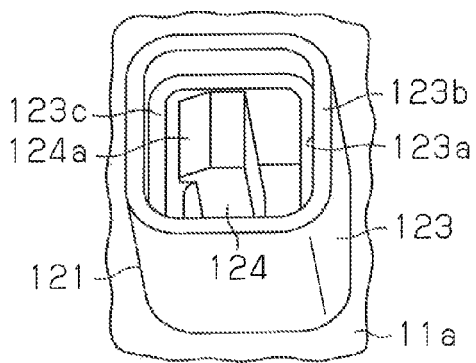
FIG. 5C is a perspective view of a first fastening support of FIG. 5A.

As shown in FIGS. 5A and 5C, the first fastening support 121 projects into the first case 11 from the bottom portion 11a of the first case 11, and is integrally formed with the bottom portion 11a. The first fastening support 121 includes a tubular surrounding portion 123 extending orthogonal to the bottom portion 11a of the first case 11, and an engagement hook 124 arranged on the inner side of the surrounding portion 123. A seat recess 123a is arranged in a recessed manner at the distal end of the surrounding portion 123. The distal end of the surrounding portion 123 has a shape including a step difference by forming the seat recess 123a. The distal end face of the surrounding portion 123 is a first receiving surface 123b having a planar shape that is orthogonal to the axial direction of the surrounding portion 123, that is, parallel to the bottom portion 11a of the first case 11. The bottom surface of the seat recess 123a is a second receiving surface 123c (sandwiching surface) of a planar shape that is parallel to the first receiving surface 123b.

The engagement hook 124 extends toward the opening of the surrounding portion 123 at the inner side of the surrounding portion 123, and the basal end of which is integrally formed with the bottom portion 11a. A first engagement projection 124a is formed at the distal end of the engagement hook 124. The first engagement projection 124a projects in a direction orthogonal to the axial direction (same as the opposing direction of the bottom portion 11a and the upper bottom portion 12a) of the surrounding portion 123. The engagement hook 124 can tilt with respect to the axial direction of the surrounding portion 123 while elastically deforming.

As shown in FIGS. 5A and 5B, the second fastening support 122 projects into the second case 12 (inner side of the housing 10) from the position facing the first fastening support 121 in the upper bottom portion 12a of the second case 12, and is integrally formed with the upper bottom portion 12a. The second fastening support 122 has a tubular shape extending orthogonal to the upper bottom portion 12a of the second case 12. The second fastening support 122 is formed to have the same thickness as the surrounding portion 123. An insertion portion 122a narrower than the basal end of the second fastening support 122 is formed at the distal end of the second fastening support 122. The outer shape of the insertion portion 122a is slightly smaller than the inner circumferential surface of the seat recess 123a. The distal end of the second fastening support 122 has a shape including a step difference by arranging the insertion portion 122a. The distal end face of the insertion portion 122a (same as the distal end face of the second fastening support 122) becomes a first contacting surface 122b of a planar shape that is orthogonal to the axial direction of the second fastening support 122, that is, parallel to the upper bottom portion 12a of the second case 12. In the second fastening support 122, a second contacting surface 122c adjacent in the radial direction with the basal end of the insertion portion 122a is formed on the outer side of the basal end of the insertion portion 122a. The second contacting surface 122c is formed to a planar shape parallel to the first contacting surface 122b, and is formed to an annular shape that surrounds the basal end of the insertion portion 122a. The axial length of the insertion portion 122a, that is, the distance between the first contacting surface 122b and the second contacting surface 122c is equal to the depth (axial depth) of the seat recess 123a, that is, the distance between the first receiving surface 123b and the second receiving surface 123c. The second fastening support 122 includes an inner circumferential surface that defines a through window hole 122d. The through window hole 122d extends through the second fastening support 122 in the opposing direction of the first fastening support 121 and the second fastening support 122, and opens to the outer surface of the second case 12. A second engagement projection 122e is formed at the end on the distal end side of the second fastening support 122 in the inner circumferential surface of the second fastening support 122. The second engagement projection 122e projects in a direction opposite to the projecting direction of the first engagement projection 124a.

As shown in FIGS. 5A and 5C, when overlapping the first case 11 and the second case 12 and snap-fitting and engaging the engagement piece 12c with the engagement projection 11c, the first fastening support 121 and the second fastening support 122 formed as above have the distal end of the engagement hook 124 is inserted inside the through window hole 122d. When the first engagement projection 124a moves over the second engagement projection 122e, the first engagement projection 124a and the second engagement projection 122e are brought into contact and engaged in the opposing direction of the bottom portion 11a and the upper bottom portion 12a. In other words, the engagement hook 124 is snap-fitted and engaged with the second fastening support 122. The first fastening support 121 and the second fastening support 122 thus fasten the first case 11 and the second case 12 at the inner side (inside) of the housing 10 and support the bottom portion 11a of the first case 11 and the upper bottom portion 12a of the second case 12. The distal end of the engagement hook 124 snap-fitted and engaged with the second engagement projection 122e is arranged in the through window hole 122d.

When the engagement hook 124 snap-fit engages the second engagement projection 122e, the insertion portion 122a of the second fastening support 122 is inserted into the seat recess 123a of the surrounding portion 123, and the second contacting surface 122c contacts the first receiving surface 123b and the first contacting surface 122b contacts the second receiving surface 123c. The second receiving surface 123c contacts the end face (i.e., first contacting surface 122b) closer to the first fastening support 121 in the second fastening support 122 from the opposing direction of the first fastening support 121 and the second fastening support 122, and sandwiches the end (i.e., distal end of the second fastening support 122) closer to the first fastening support 121 in the second fastening support 122 in the opposing direction of the first fastening support 121 and the second fastening support 122 with the first engagement projection 124a of the engagement hook 124. In such a fastening unit 120, the first fastening support 121 and the second fastening support 122 are coupled by engaging the step difference between the first receiving surface 123b and the second receiving surface 123c with the step difference between the first contacting surface 122b and the second contacting surface 122c. Thus, the labyrinth structure portion 114 forming the labyrinth structure is formed between the distal end of the surrounding portion 123 of the first fastening support 121 and the distal end of the second fastening support 122.

This also obtains advantages (1), (2), (5), and (6) of the first embodiment. Furthermore, the fastening unit 120 includes the first fastening support 121 integrally formed with the first case 11 and the second fastening support 122 integrally formed with the second case 12, and thus does not require another component such as a screw and the like. Therefore, the number of components can be reduced. Since the first fastening support 121 and the second fastening support 122 fasten the first case 11 and the second case 12 by snap-fit engagement, the fastening of the first case 11 and the second case 12 by the fastening unit 120 can be easily carried out. Furthermore, the engagement state of the engagement hook 124 and the second engagement projection 122e can be visually recognized from the through window hole 122d. The distal end of the engagement hook 124 is arranged inside the through window hole 122d, and hence the distal end of the engagement hook 124 is suppressed from getting caught at the components arranged at the periphery of the motor actuator 1 and the like. The end (i.e., distal end of the second fastening support 122) closer to the first fastening support 121 in the second fastening support 122 is sandwiched in the opposing direction of the first fastening support 121 and the second fastening support 122 by the second receiving surface 123c and the first engagement projection 124a of the engagement hook 124. Therefore, the spacing between the first case 11 and the second case 12 is maintained by the fastening unit 120, and the housing 10 is suppressed from expanding or depressing near the fastening unit 120. In the fastening unit 120, the second contacting surface 122c contacts the first receiving surface 123b and the first contacting surface 122b contacts the second receiving surface 123c. Therefore, even if the engagement hook 124 breaks, the fragment of the engagement hook 124 is suppressed from entering into the housing 10 from between the distal end of the first fastening support 121 and the distal end of the second fastening support 122 facing the first fastening support 121 in the opposing direction of the bottom portion 11a and the upper bottom portion 12a.

In the fastening unit 120 shown in FIG. 5A, the second fastening support 122 may be formed on the first case 11, and the first fastening support 121 may be formed on the second case 12. As shown in FIG. 6, two engagement hooks 124 may be arranged in the first fastening support 121. In this case, two engagement projections 122e to which two engagement hooks 124 contact and are engaged with in the opposing direction of the bottom portion 11a and the upper bottom portion 12a are arranged in the second fastening support 122. The first fastening support 121 and the second fastening support 122 thus can be more securely fastened.

In place of the fastening unit 101 of the first embodiment, a fastening unit 130 shown in FIG. 7 may be arranged inside the housing 10. The fastening unit 130 includes a first fastening support 131 arranged on the first case 11 and a second fastening support 132 arranged on the second case 12. The first fastening support 131 projects into the first case 11 from the bottom portion 11a of the first case 11, and is integrally formed with the bottom portion 11a. The first fastening support 131 has a substantially tubular shape extending orthogonal to the bottom portion 11a of the first case 11. A partitioning wall 131a for partitioning the internal space of the first fastening support 131 in the axial direction is formed inside the first fastening support 131. With the arrangement of such a partitioning wall 131a, a seat recess 131b is formed at the distal end of the first fastening support 131. The distal end of the first fastening support 131 has a shape including a step difference by forming the seat recess 131b. The distal end face of the first fastening support 131 is a first receiving surface 131c that is planar and parallel to the bottom portion 11a. Furthermore, the bottom surface of the seat recess 131b is a second receiving surface 131d that is planar and parallel to the first receiving surface 131c. A rod-shaped engagement protrusion 131e projecting toward the distal end of the first fastening support 131 is integrally formed at the central part of the partitioning wall 131a.

The second fastening support 132 projects into the second case 12 (inner side of the housing 10) from a position facing the first fastening support 131 in the upper bottom portion 12a of the second case 12, and is integrally formed with the upper bottom portion 12a. The second fastening support 132 has a substantially tubular shape extending orthogonal to the upper bottom portion 12a of the second case 12. An insertion portion 132a narrower than the basal end of the second fastening support 132 is formed at the distal end of the second fastening support 132. The outer shape of the insertion portion 132a is slightly smaller than the inner circumferential surface of the seat recess 131b. The distal end of the second fastening support 132 has a shape including a step difference by arranging the insertion portion 132a. The distal end face of the insertion portion 132a (same as the distal end face of the second fastening support 132) is a first contacting surface 132b having a planar shape parallel to the upper bottom portion 12a. In the second fastening support 132, a second contacting surface 132c adjacent in the radial direction with the basal end of the insertion portion 132a is formed on the outer side of the basal end of the insertion portion 132a. The second contacting surface 132c has a planar shape parallel to the first contacting surface 132b and has an annular shape that surrounds the basal end of the insertion portion 132a. The axial length of the insertion portion 132a, that is, the distance between the first contacting surface 132b and the second contacting surface 132c is equal to the depth (axial depth) of the seat recess 131b, that is, the distance between the first receiving surface 131c and the second receiving surface 131d. An engagement projection 132d projecting to the inner side is formed at the distal end of the insertion portion 132a. The engagement projection 132d is formed to an annular shape, and the insertion hole 132e is formed on the inner side of the engagement projection 132d.

In the first fastening support 131 and the second fastening support 132, the engagement protrusion 131e is inserted into the insertion hole 132e when overlapping the first case 11 and the second case 12 and snap-fitting and engaging the engagement piece 12c with the engagement projection 11c. The distal end of the engagement protrusion 131e is heated and squeezed into the second fastening support 132 to be formed thicker than the insertion hole 132e. In other words, the first fastening support 131 and the second fastening support 132 are fastened by thermal caulking. The first fastening support 131 and the second fastening support 132 fasten the first case 11 and the second case 12 to the inner side (inside) of the housing 10, and support the bottom portion 11a of the first case 11 and the upper bottom portion 12a of the second case 12. When the engagement protrusion 131e is inserted to the insertion hole 132e, the insertion portion 132a of the second fastening support 132 is inserted to the seat recess 131b of the first fastening support 131, and the second contacting surface 132c is brought into contact with the first receiving surface 131c and the first contacting surface 132b is brought into the second receiving surface 131d. In the fastening unit 130, the first fastening support 131 and the second fastening support 132 are coupled by engaging the step difference between the first receiving surface 131c and the second receiving surface 131d with the step difference between the first contacting surface 132b and the second contacting surface 132c. Thus, the labyrinth structure portion 114 is formed between the distal end of the first fastening support 131 and the distal end of the second fastening support 132.

This obtains advantages (1), (2), (5), (6) of the first embodiment. Furthermore, the fastening unit 130 is formed by the first fastening support 131 integrally formed with the first case 11 and second fastening support 132 integrally formed with the second case 12, and does not require another component such as a screw and the like. Therefore, the number of components can be reduced.

A fastening unit 140 shown in FIG. 8 may be arranged inside the housing 10 in place of the fastening unit 101 of the first embodiment described above. In the fastening unit 140 shown in FIG. 8, the same reference numerals are used for components that are the same as the fastening unit 130 shown in FIG. 7. Such components will not be described. The fastening unit 140 includes a first fastening support 141 arranged on the first case 11, the second fastening support 132 arranged on the second case 12, and a tubular eyelet member 143. The first fastening support 141 projects into the first case 11 from the bottom portion 11a of the first case 11, and is integrally formed with the bottom portion 11a. The first fastening support 141 has a substantially tubular shape extending orthogonal to the bottom portion 11a of the first case 11. An annular engagement projection 141a projecting to the inner side of the first fastening support 141 is integrally formed on the inner circumferential surface of the first fastening support 141. An insertion hole 141b having a diameter equal to the insertion hole 132e of the second fastening support 132 is formed on the inner side of the engagement projection 141a. In the first fastening support 141, the portion on the distal end side than the engagement projection 141a is the seat recess 131b.

In the first fastening support 141 and the second fastening support 132, the insertion portion 132a is inserted into the seat recess 131b when overlapping the first case 11 and the second case 12 and snap-fitting and engaging the engagement piece 12c with the engagement projection 11c. The eyelet member 143 having an outer diameter substantially equal to the inner diameter of the insertion hole 141b and the insertion hole 132e is inserted into the insertion hole 141b and the insertion hole 132e, and both ends of the eyelet member 143 are caulked. The first fastening support 141 and the second fastening support 132 are fastened by the eyelet member 143. The first fastening support 141, the second fastening support 132, and the eyelet member 143 (i.e., fastening unit 140) fasten the first case 11 and the second case 12 on the inner side (inside) of the housing 10, and support the bottom portion 11a of the first case 11 and the upper bottom portion 12a of the second case 12.

This obtains advantages (1), (2), (5), (6) of the first embodiment. Furthermore, since the boundary of the second receiving surface 131d and the first contacting surface 132b is covered by the eyelet member 143 from the inner side, liquid such as water and the like is further suppressed from entering inside the housing 10 from the boundary of the first fastening support 141 and the second fastening support 132.

The fastening unit 101 may be arranged in an area other than the area of the first embodiment described above as long as it is within the fastening unit formation range A1. The housing 10 may include a plurality of fastening units 101 within the fastening unit formation range A1.

Figure 9:
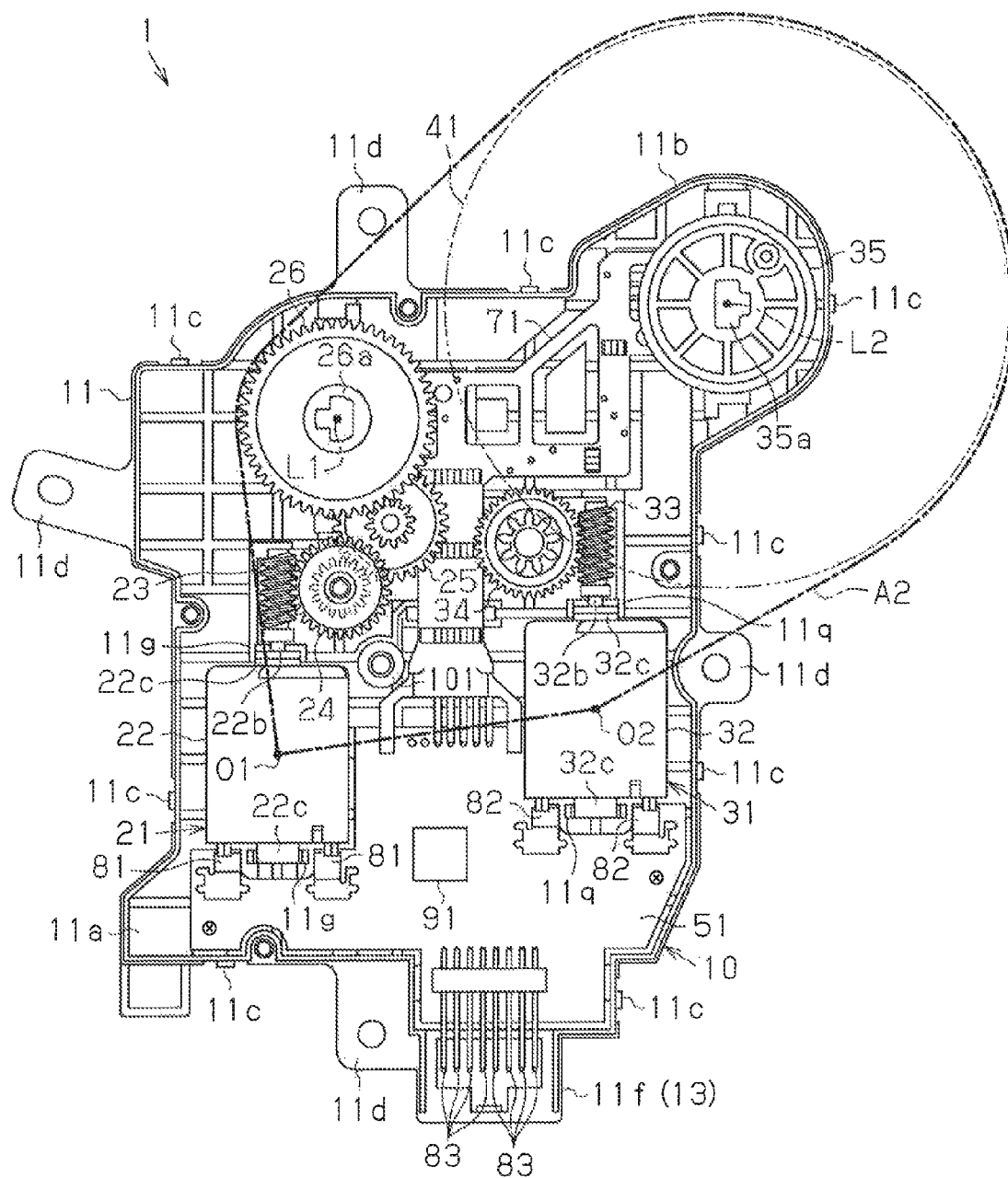
FIG. 9 is a plan view of an actuator showing a fastening unit formation range of another mode.

In the first embodiment described above, the housing 10 includes the fastening unit 101 within the fastening unit formation range A1 as viewed from the direction in which the rotation axis L1 of the output gear 26 extends (direction in which the rotation axis L2 of the sensor output shaft portion 35 extends). However, the housing 10 may include the fastening unit 101 within a fastening unit formation range A2 (third fastening unit formation range) shown in FIG. 9 as viewed from the direction in which the rotation axis L1 of the output gear 26 extends (direction in which the rotation axis L2 of the sensor output shaft portion 35 extends). The fastening unit formation range A2 is a range formed by connecting the center of gravity O1 of the motor 22, the center of gravity O2 of the motor 32, the contour of the sensor output shaft portion 35 of the final stage, and the contour of the output gear 26 of the final stage as viewed from the direction in which the rotation axis L1 of the output gear 26 extends (direction in which the rotation axis L2 of the sensor output shaft portion 35 extends). The contour of the sensor output shaft portion 35 is used as the contour of the link member 41 because the link member 41 plays the role of the gear of the sensor output shaft portion 35. The fastening unit formation range A1 of the first embodiment described above is the range formed in the fastening unit formation range A2. The fastening unit 101 may be arranged in an area other than the illustrated area as long as it is within the fastening unit formation range A2, and the number of the fastening unit 101 is not limited to one.

The fastening unit 101 can be brought closer to the position where the force acts on the housing 10 from each motor 22, 32 while suppressing the fastening unit 101 from moving away from the position where the force acts on the housing 10 from the output gear 26 of the final stage and the sensor output shaft portion 35 of the final stage by arranging the fastening unit 101 within the fastening unit formation range A2. Although the force acting on the housing 10 from each motor 22, 32 is smaller than the force acting on the housing 10 from the output gear 26 of the final stage and the sensor output shaft portion 35 of the final stage, the force acting on the housing 10 from each motor 22, 32 also causes deformation of the housing 10 if the motor actuator 1 is actually activated. Therefore, the housing 10 is more easily suppressed by the fastening unit 101 from deforming by the force acting on the housing 10 from each motor 22, 32 and the force acting on the housing 10 from the output gear 26 of the final stage and the sensor output shaft portion 35 of the final stage by arranging the fastening unit 101 within the fastening unit formation range A2.

Figure 10:
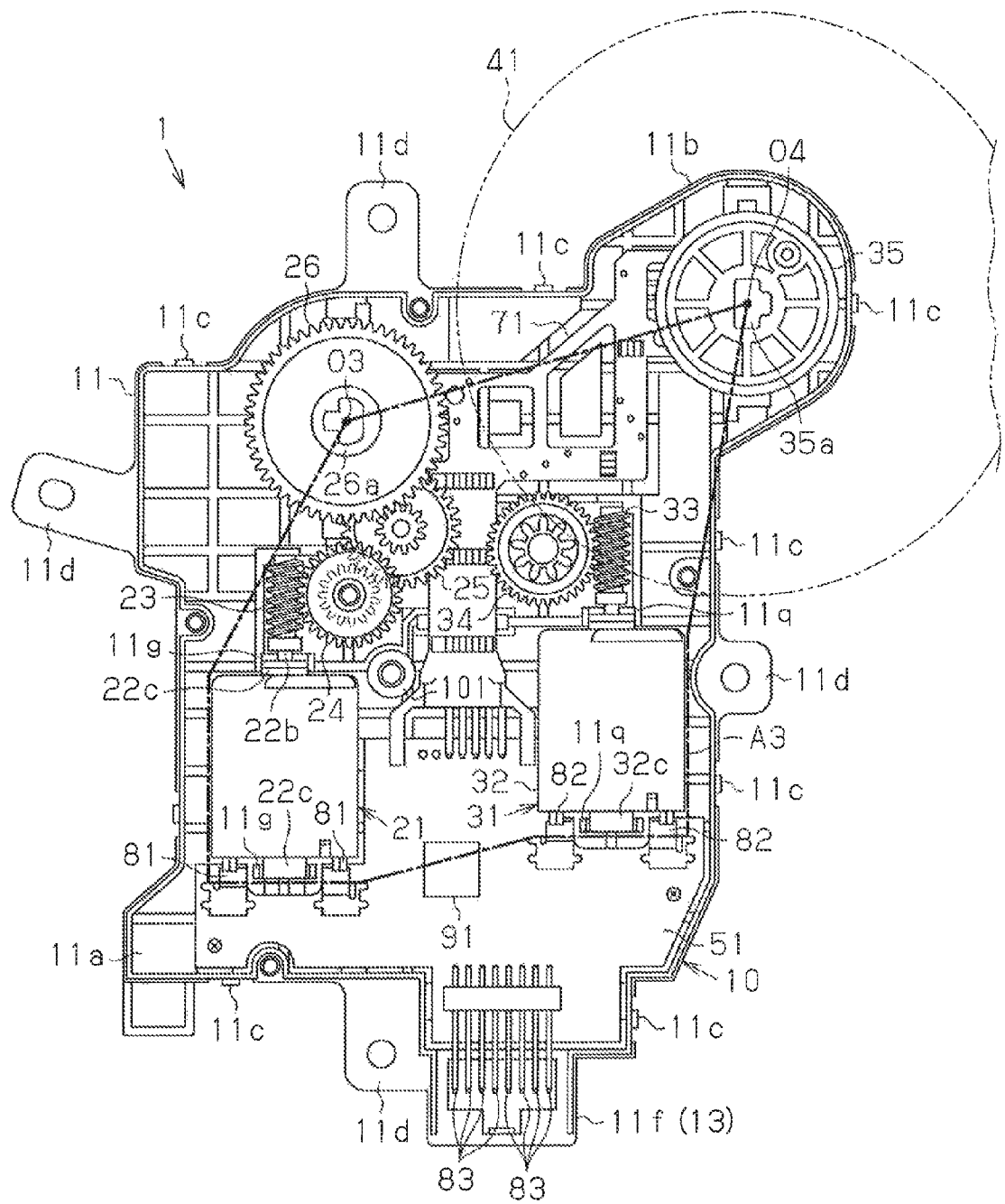
FIG. 10 is a plan view of an actuator showing a further form of a fastening unit formation range.

The housing 10 may include the fastening unit 101 within a fastening unit formation range A3 (second fastening unit formation range) shown in FIG. 10 as viewed from the direction in which the rotation axis L1 of the output gear 26 extends (direction in which the rotation axis L2 of the sensor output shaft portion 35 extends). The fastening unit formation range A3 is a range formed by connecting the contours of the motors 22, 32, the rotation center O3 of the output gear 26 of the final stage and the rotation center O4 of the sensor output shaft portion 35 of the final stage as viewed from the direction in which the rotation axis L1 of the output gear 26 extends (direction in which the rotation axis L2 of the sensor output shaft portion 35 extends). The rotation center O3 of the output gear 26 is connected to the contour of the motor 22 arranged at a closer position. The rotation center O3 of the output gear 26 is connected to the position to become closer to the periphery of the housing 10 in the contour of the motor 22 and the position closer to the rotation center O3 of the output gear 26 with respect to the contour of the motor 22. In the same manner, the rotation center O4 of the sensor output shaft portion 35 is connected to the contour of the motor 32 arranged at a closer position. The rotation center O4 of the sensor output shaft portion 35 is connected to the position to become closer to the periphery of the housing 10 in the contour of the motor 32 and the position closer to the rotation center O4 of the sensor output shaft portion 35 with respect to the contour of the motor 32. The fastening unit formation range A1 of the first embodiment described above is a range formed within the fastening unit formation range A3. The fastening unit 101 may be arranged in an area other than the illustrated area as long as it is within the fastening unit formation range A3, and the number of the fastening unit 101 is not limited to one.

In each of the output mechanisms 21, 31, the rotation transmitted to each deceleration gear (i.e., worm 23, first deceleration gear 24, second deceleration gear 25, output gear 26, worm 33, output gear 34, sensor output shaft portion 35) has a greater torque than the torque of the motor 22, 32, where the torque becomes greater toward the post-stage. Thus, the force acting on the housing 10 from the output gear 26 of the final stage and the sensor output shaft portion 35 of the final stage is large compared to the force acting on the housing 10 from each motor 22, 32. In other words, the force acting on the housing 10 from the output gear 26 of the final stage and the sensor output shaft portion 35 of the final stage is more likely to cause deformation of the housing 10 compared to the force acting on the housing 10 from the motor 22, 32. Furthermore, the position where the force acts on the housing 10 from the output gear 26 of the final stage and the sensor output shaft portion 35 of the final stage rotatably supported by the housing 10 is near the rotation center O3 of the output gear 26 of the final stage and near the rotation center O4 of the sensor output shaft portion 35 of the final stage. Therefore, the fastening unit 101 can be brought closer to the position where the force acts on the housing 10 from the output gear 26 of the final stage and the sensor output shaft portion 35 of the final stage by arranging the fastening unit 101 within the fastening unit formation range A3 formed by connecting the contours of the motors 22, 32, the rotation center O3 of the output gear 26 of the final stage, and the rotation center O4 of the sensor output shaft portion 35 of the final stage. The housing 10 is more easily suppressed by the fastening unit 101 from deforming by the force acting on the housing 10 from each motor 22, 32 and the force acting on the housing 10 from the output gear 26 of the final stage and the sensor output shaft portion 35 of the final stage. As a result, the deformation of the housing 10 accommodating the plurality of output mechanisms 21, 31 can be further suppressed. Although the force acting on the housing 10 from each motor 22, 32 is smaller than the force acting on the housing 10 from the output gear 26 of the final stage and the sensor output shaft portion 35 of the final stage, the force acting on the housing 10 from each motor 22, 32 also causes deformation of the housing 10 if the motor actuator 1 is actually activated. Thus, arranging the fastening unit 101 within the fastening unit formation range A3 is effective in suppressing the deformation of the housing 10.

Figure 11:
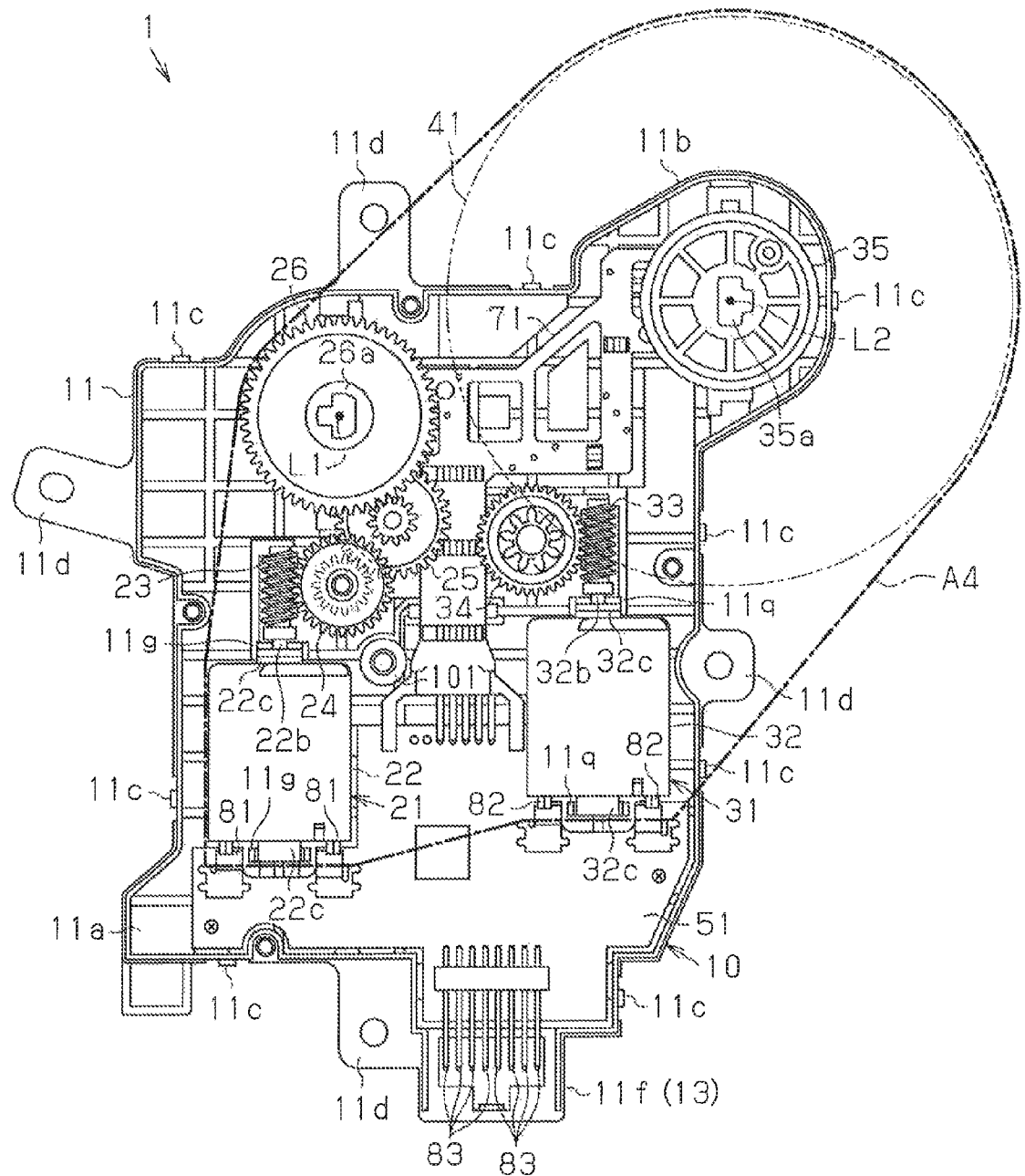
FIG. 11 is a plan view of an actuator showing a further form of a fastening unit formation range.

The housing 10 may include the fastening unit 101 within a fastening unit formation range A4 (first fastening unit formation range) shown in FIG. 11 as viewed from the direction in which the rotation axis L1 of the output gear 26 extends (direction in which the rotation axis L2 of the sensor output shaft portion 35 extends). The fastening unit formation range A4 is a range that is formed by connecting the contours of the motors 22, 32, the contour of the output gear 26 of the final stage, and the contour of the sensor output shaft portion 35 of the final stage, and that surrounds each motor 22, 32, the output gear 26 of the final stage, and the sensor output shaft portion 35 of the final stage as viewed from the direction in which the rotation axis L1 of the output gear 26 extends (direction in which the rotation axis L2 of the sensor output shaft portion 35 extends). The contour of the sensor output shaft portion 35 is used as the contour of the link member 41 because the link member 41 plays a role of the gear of the sensor output shaft portion 35. The contour of the motor 22, the contour of the motor 32, the contour of the output gear 26, and the contour of the sensor output shaft portion 35 (i.e., contour of the link member 41) are respectively connected to a position to become closer to the periphery of the housing 10 in the contour of the member arranged at a closer position. The fastening unit formation range A2 shown in FIG. 9 and the fastening unit formation range A3 shown in FIG. 10 are ranges formed within the fastening unit formation range A4. The fastening unit 101 may be arranged in an area other than the illustrated area as long as it is within the fastening unit formation range A4, and the number of the fastening unit 101 is not limited to one.

Since a plurality of (two in the example shown in FIG. 11) output mechanisms 21, 31 is accommodated in the housing 10, a plurality of motors 22, 32 and a plurality of deceleration gears of the final stage (i.e., the output gear 26 and the sensor output shaft portion 35) are accommodated. In the motor actuator 1, the fastening unit 101 can be suppressed from becoming distant from the position where the force acts on the housing 10 from each motor 22, 32, and the position where the force acts on the housing 10 from the output gear 26 of the final stage and the sensor output shaft portion 35 of the final stage by arranging the fastening unit 101 within the fastening unit formation range A4. Therefore, the housing 10 is easily suppressed by the fastening unit 101 from deforming by the force acting on the housing 10 from each motor 22, 32 and the force acting on the housing 10 from the output gear 26 of the final stage and the sensor output shaft portion 35 of the final stage. As a result, the deformation of the housing 10 accommodating the plurality of output mechanisms 21, 31 can be suppressed.

In the first embodiment described above, the number of output mechanisms 21, 31 accommodated in the housing 10 is two. However, three or more output mechanisms, each of which is formed by the motor and the deceleration gear for decelerating and outputting the rotation of the motor, may be accommodated in the housing 10.

The number of deceleration gears arranged in each output mechanism 21, 31 is not limited to the number described in the first embodiment as long as there is at least one deceleration gear. Among the deceleration gears of each output mechanism 21, 31, at least the deceleration gear of the final stage (i.e., the output gear 26 and the sensor output shaft portion 35) is rotatably supported by the housing 10.

Second Embodiment

A second embodiment of the motor actuator will now be described with reference to FIGS. 12 to 21. The same reference numerals are used for components that are the same as the first embodiment. Such components will not be described and the description will focus on different components.

Figure 12:
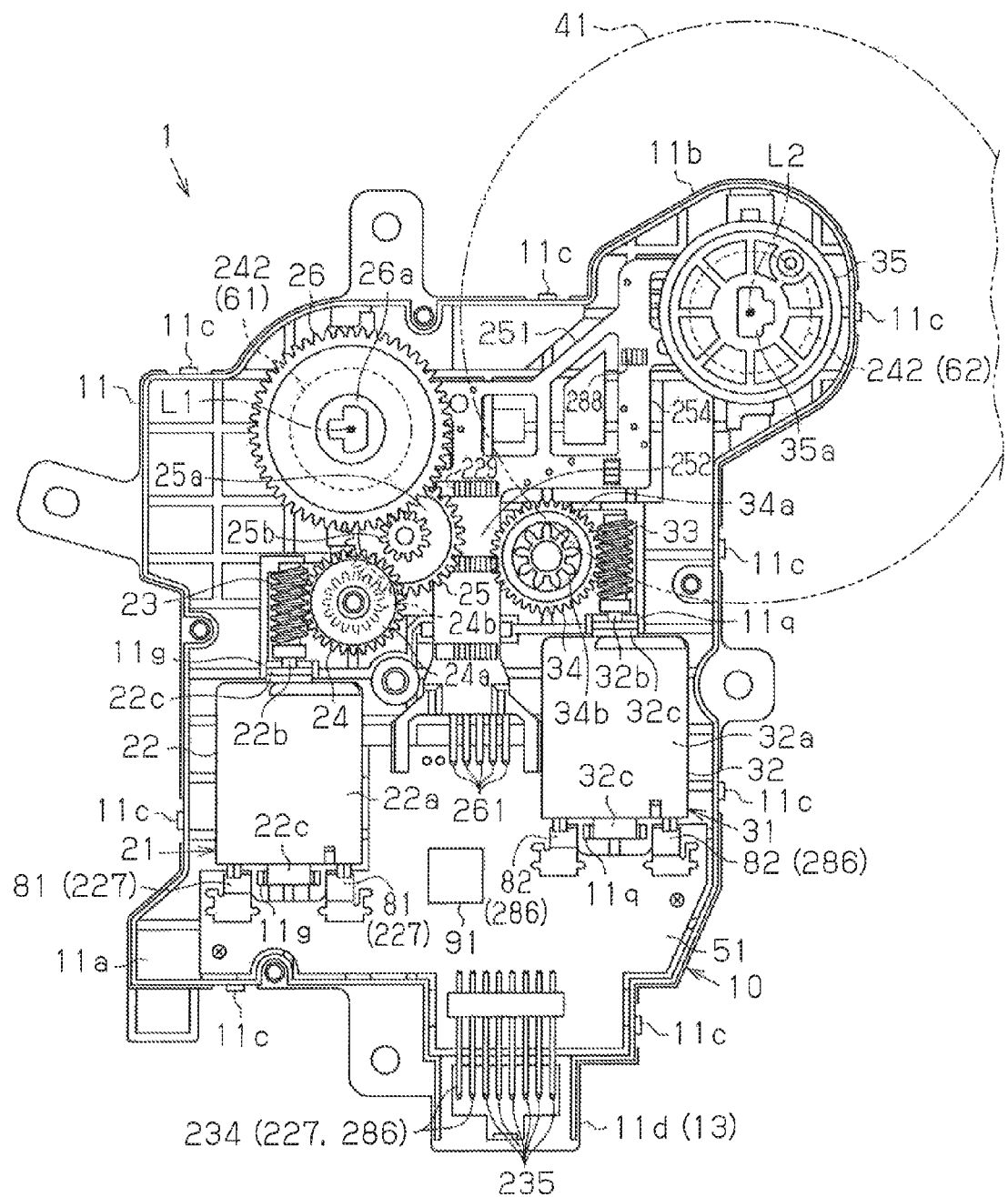
FIG. 12 is a plan view of a motor actuator, without a second case, according to a second embodiment of the present invention.

The motor actuator 1 shown in FIG. 12 includes the housing 10, a plurality of (two in the present embodiment) output mechanisms 21, 31 (i.e., the first output mechanism 21 and the second output mechanism 31) accommodated in the housing 10 and the like. The housing 10 and the output mechanisms 21, 31 have configurations similar to the first embodiment.

As shown in FIG. 12, the first output mechanism 21 of the second embodiment includes the motor 22, the worm 23, the first deceleration gear 24, the second deceleration gear 25, the output gear 26, a first power supplying terminal unit 227, the first position detection sensor 61, and a first sensor signal line 229.

Figure 14:
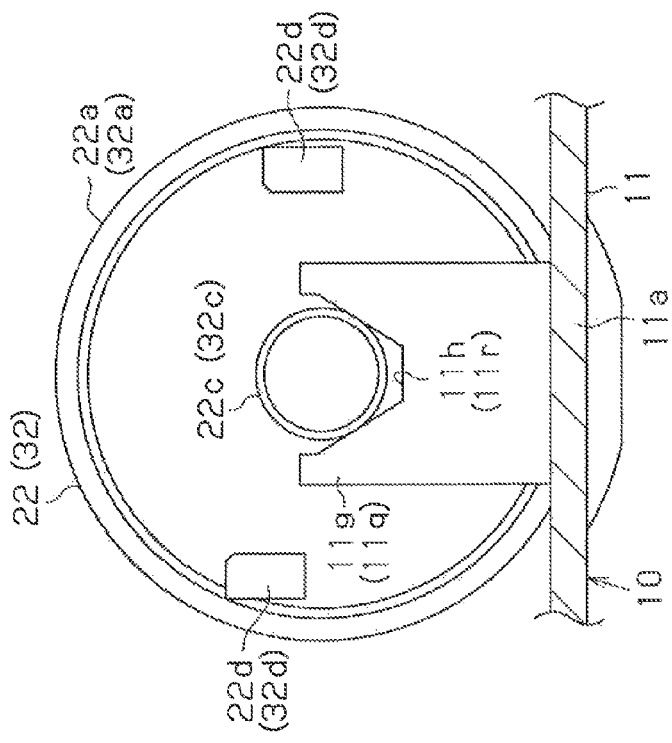
FIG. 14 is a side view of a motor of FIG. 12.

As shown in FIGS. 12 and 14, the motor 22 includes the cylindrical housing case 22a having two closed opposite ends. The rotation shaft 22b of the motor 22 projects from the middle of the first end face in the axial direction of the housing case 22a, and a pair of motor power supplying terminals 22d for receiving supply of power is arranged at the second end face in the axial direction of the housing case 22a.

Figure 16:
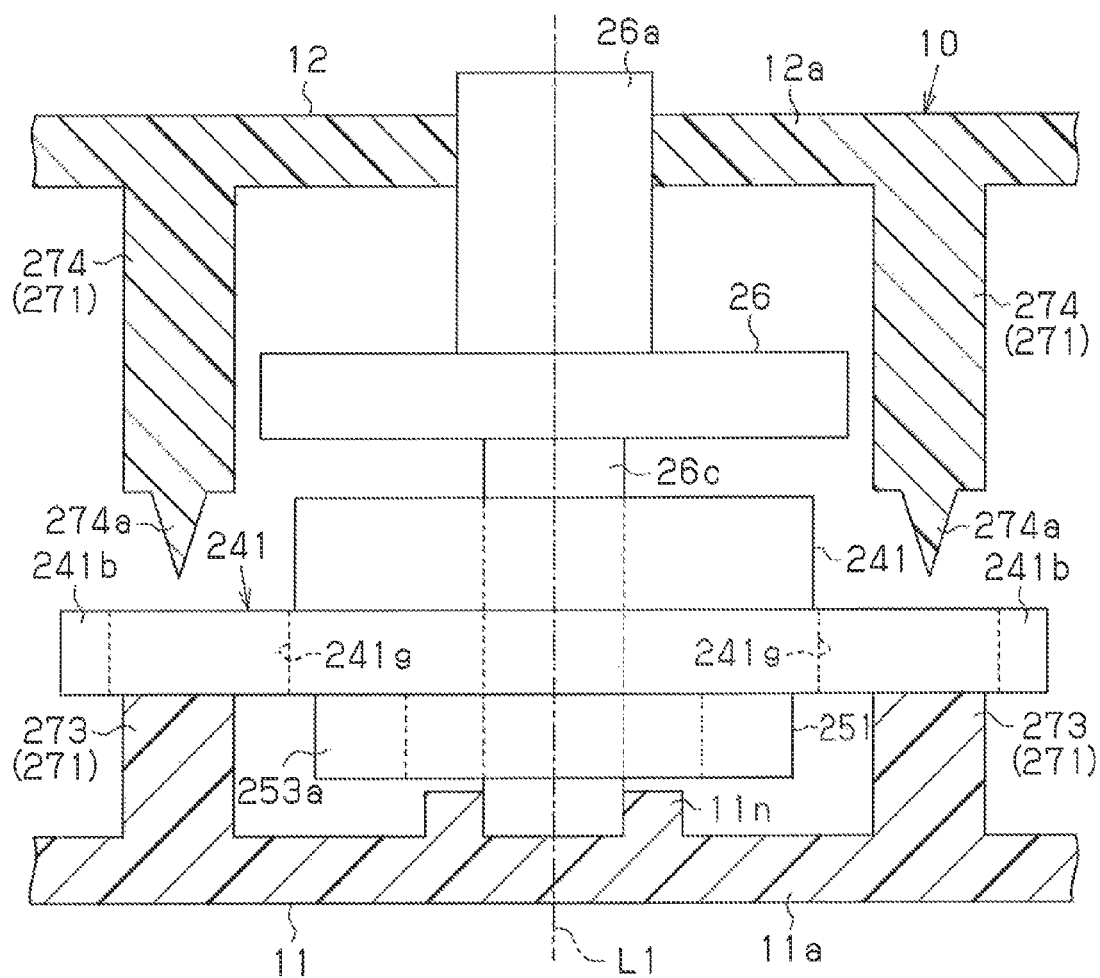
FIG. 16 is a schematic diagram showing a position detection sensor of FIG. 12 fixed to a housing.

As shown in FIG. 16, a supporting shaft 26c extending in a direction opposite to the output shaft portion 26a along the direction of the rotation axis L1 of the output gear 26 is formed at a central part in the radial direction of the output gear 26 of the first output mechanism 21. The supporting shaft 26c is rod-shaped and has a substantially D-shaped cross-section.

Figure 15:
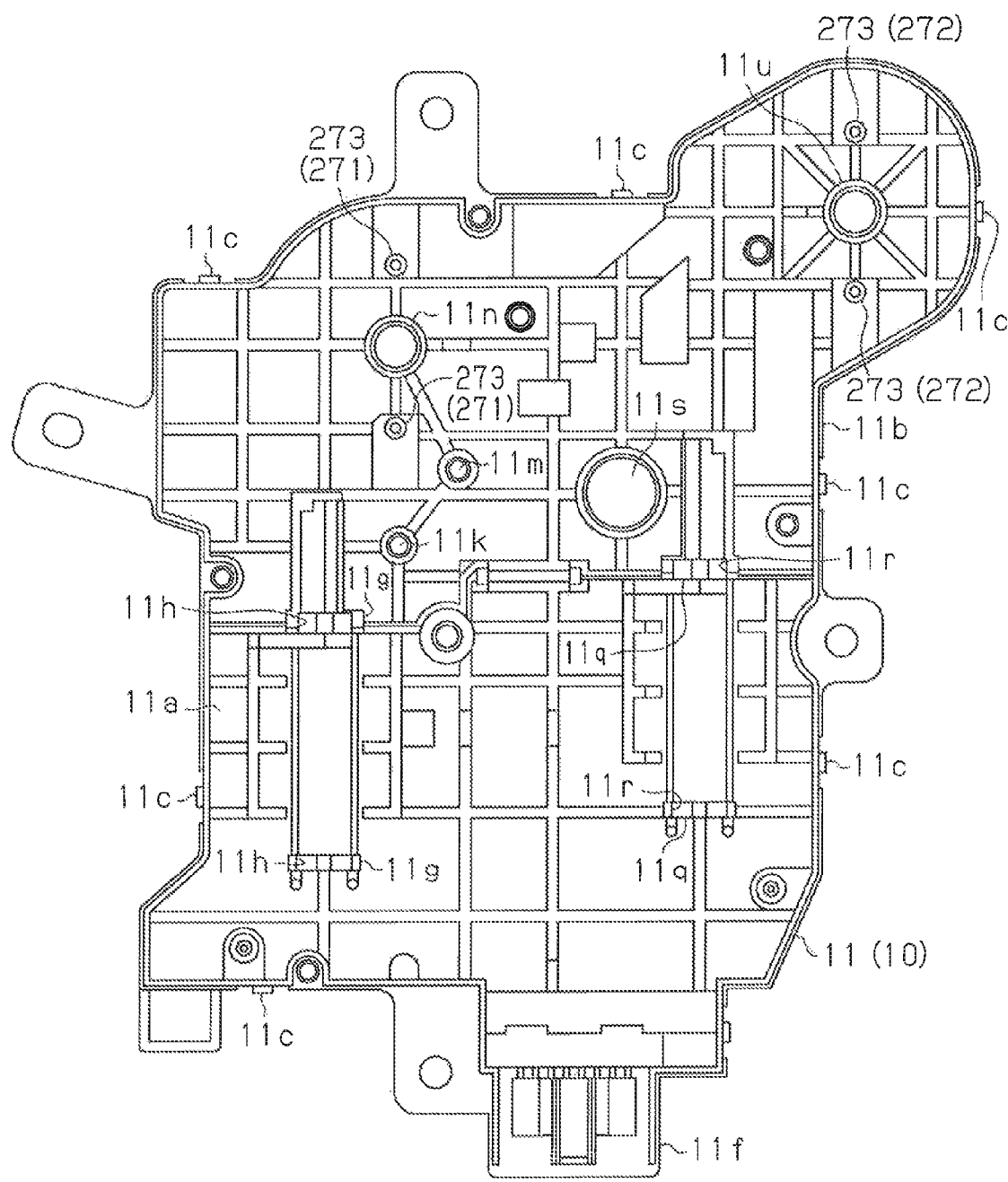
FIG. 15 is a plan view of a first case of FIG. 12.

As shown in FIGS. 12, 15, and 16, the third shaft supporting portion 11n of the second embodiment projects from the bottom portion 11a of the first case 11 perpendicular to the bottom portion 11a, and has a circular ring shape. The output gear 26 is rotatably supported by the third shaft supporting portion 11n by inserting the distal end of the supporting shaft 26c to the inner side of the third shaft supporting portion 11n. In other words, the output gear 26 is rotatably supported by the housing 10 including the third shaft supporting portion 11n. The output gear 26 axially supported by the third shaft supporting portion 11n is engaged with the second small diameter gear 25b of the second deceleration gear 25. Furthermore, the output shaft portion 26a extends through the upper bottom portion 12a of the second case 12 and projects to the exterior of the housing 10. The link mechanism (not illustrated) for operating the blower duct switching door is coupled to the distal end of the output shaft portion 26a projecting to the exterior of the housing 10. In other words, the output shaft portion 26a is coupled to the blower duct switching door by the link mechanism.

As shown in FIG. 12, the circuit substrate 51 is accommodated in the housing 10. The drive IC 91 for performing the control of the motor actuator 1 is mounted on the circuit substrate 51. Furthermore, the first power supplying terminal unit 227 is arranged on the circuit substrate 51. The first power supplying terminal unit 227 includes the pair of first power supplying terminals 81 and a pair of power supplying connector terminals 234.

As shown in FIGS. 12 and 14, the pair of first power supplying terminals 81 is arranged in an upright manner on the circuit substrate 51 near the end in the axial direction where the pair of motor power supplying terminals 22d is arranged in the motor 22. The pair of first power supplying terminals 81 is pressed against the pair of motor power supplying terminals 22d to be electrically connected to the motor power supplying terminals 22d.

As shown in FIG. 12, the pair of power supplying connector terminals 234 is arranged at a portion in the vicinity of the connector unit 13 in the circuit substrate 51. The pair of power supplying connector terminals 234 is provided to supply power to the motor actuator 1. The pair of power supplying connector terminals 234 each has a rod-shape and includes a basal end connected to the circuit substrate 51 and a distal end projecting into the connector unit 13. The pair of power supplying connector terminals 234 is electrically connected to the pair of first power supplying terminals 81 by the circuit substrate 51.

A plurality of (six in the present embodiment) signal connector terminals 235 is arranged parallel to the pair of power supplying connector terminals 234 at a portion in the vicinity of the connector unit 13 in the circuit substrate 51. Such signal connector terminals 235 are provided to exchange electric signals with the external device (not shown) mounted on the vehicle. Each signal connector terminal 235 has a rod-shape, where the basal end is connected to the circuit substrate 51 and the distal end projects to the interior of the connector unit 13.

The pair of power supplying connector terminals 234 and the plurality of signal connector terminals 235 are electrically connected to an external connector (not shown) inserted to the connector unit 13. The power supply to the motor actuator 1, the exchange of electric signals with the external device (not illustrated), and the like are carried out through the external connector.

Figure 17:
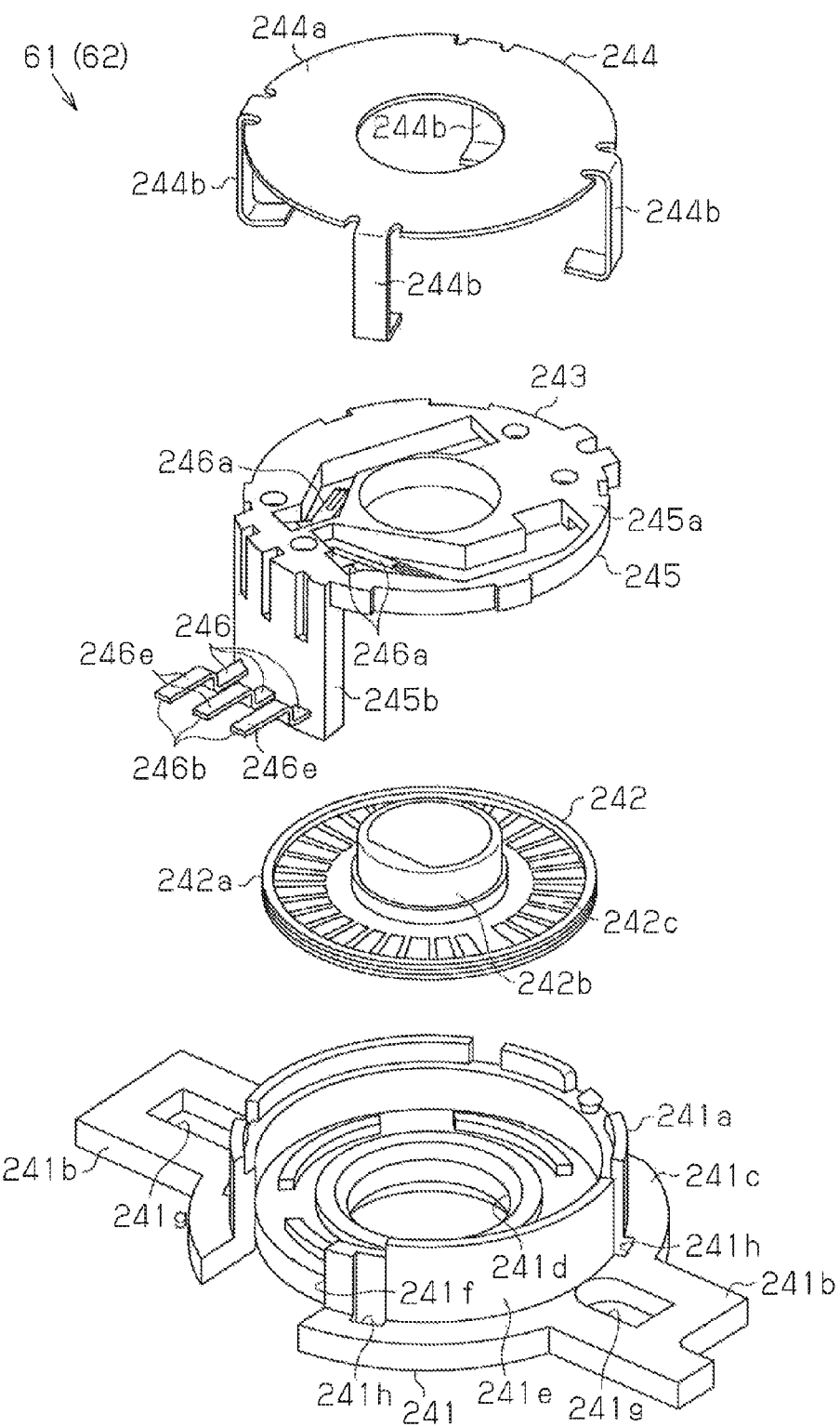
FIG. 17 is an exploded perspective view of the position detection sensor shown in FIG. 12.

The first position detection sensor 61 for detecting the rotation position of the output gear 26 is attached to the output gear 26. As shown in FIG. 17, the first position detection sensor 61 includes a holding member 241, a rotation member 242, a terminal member 243, and a lid member 244.

As shown in FIGS. 16 and 17, the holding member 241 includes a substantially cylindrical accommodating portion 241a, which has a closed end, and a pair of fixed portions 241b formed integrally with the accommodating portion. The outer diameter of the accommodating portion 241a is smaller than the outer diameter of the output gear 26. A through hole 241d that extends through the bottom portion 241c in the axial direction is formed at the middle of the bottom portion 241c of the accommodating portion 241a. The inner diameter of the through hole 241d is greater than the outer diameter of the supporting shaft 26c of the output gear 26. A cutout 241f is formed at one part in the circumferential direction of a side wall 241e at the side wall 241e of the accommodating portion 241a. The cutout 241f extends along the axial direction of the accommodating portion 241a and extends through the side wall 241e in the axial direction, and also extends through the side wall 241e in the radial direction. A hook insertion hole 241h is formed at plural areas in the circumferential direction in the accommodating portion 241a. The hook insertion hole 241h is formed at four areas at equal angular intervals in the circumferential direction of the accommodating portion 241a on the outer circumferential side of the side wall 241e. Each hook insertion hole 241h extends through the accommodating portion 241a in the axial direction. The pair of fixed portions 241b is extended on both sides in the diameter direction of the accommodating portion 241a from the bottom portion 241c of the accommodating portion 241a. Each fixed portion 241b includes a fixing hole 241g that extends through the fixed portion 241b in the axial direction of the accommodating portion 241a. Each fixing hole 241g is elongated in the diameter direction of the accommodating portion 241a, and a circumferential width is constant along the diameter direction of the accommodating portion 241a excluding the portion having an arcuate shape at the end on the radially inner side.

The rotation member 242 includes a signal generating unit 242a having the shape of a circular ring plate, and a coupling tube portion 242b integrally formed with the signal generating unit 242a. The signal generating unit 242a includes a conductive pattern 242c for generating a pulse signal. The outer diameter of the signal generating unit 242a is smaller than the inner diameter of the accommodating portion 241a. The coupling tube portion 242b has a cylindrical shape that projects to one side in the axial direction of the signal generating unit 242a from an inner circumferential edge of the signal generating unit 242a. The inner circumferential surface of the coupling tube portion 242b has a substantially D-shaped cross-section corresponding to the outer circumferential surface of the supporting shaft 26c. The rotation member 242 is held by the holding member 241 and accommodated in the accommodating portion 241a with the distal end of the coupling tube portion 242b facing the opening of the accommodating portion 241a. The rotation member 242 arranged on the bottom portion 241c in the accommodating portion 241a is rotatable in the circumferential direction.

As shown in FIG. 17, the terminal member 243 includes a terminal holding section 245 made from an insulative resin material, and a plurality of (three in the present embodiment) sensor terminals 246 held in the terminal holding section 245. The terminal holding section 245 includes a supporting plate 245a, which has a substantially circular ring plate shape, and an embedded holding portion 245b, which extends from the supporting plate 245a. The outer diameter of the supporting plate 245a is substantially equal to the inner diameter at the opening of the accommodating portion 241a. Furthermore, the inner diameter of the supporting plate 245a is greater than the outer diameter of the coupling tube portion 242b. The embedded holding portion 245b is extended to one side in the axial direction (i.e., toward the bottom portion 241c of the accommodating portion 241a) from one portion of the outer circumferential edge of the supporting plate 245a. The axial length of the embedded holding portion 245b is substantially equal to the axial length of the accommodating portion 241a. The radial thickness of the embedded holding portion 245b is substantially equal to the radial thickness of the side wall 241e of the accommodating portion 241a. Furthermore, the circumferential width of the embedded holding portion 245b is equal to the circumferential width of the cutout 241f.

Each sensor terminal 246 is made from a conductive metal plate material and is band-shaped. The three sensor terminals 246 are embedded and held in the embedded holding portion 245b while being spaced apart from each other to ensure the electrical insulating property among the sensor terminals 246. Specifically, each sensor terminal 246 has a central part in the longitudinal direction embedded in the embedded holding portion 245b. The ends in the longitudinal direction of each sensor terminal 246 are projected to the exterior of the embedded holding portion 245b. The portions embedded in the embedded holding portion 245b in the three sensor terminals 246 are arranged in the circumferential direction and extended along the axial direction of the supporting plate 245a. Each sensor terminal 246 has a contacting portion 246a that projects from the basal end of the embedded holding portion 245b. Each contacting portion 246a is bent at a substantially right angle at the basal end of the embedded holding portion 245b relative to the portion embedded in the embedded holding portion 245b in each sensor terminal 246, and extended along a direction substantially orthogonal to the axial direction of the supporting plate 245a toward the inner circumferential side of the supporting plate 245a. Each sensor terminal 246 also includes a sensor connection portion 246b that projects from the distal end of the embedded holding portion 245b. Each sensor connection portion 246b is bent at a right angle at the distal end of the embedded holding portion 245b relative to the portion embedded in the embedded holding portion 245b in each sensor terminal 246, and extended along the direction orthogonal to the axial direction of the supporting plate 245a toward the outer circumferential side (radially outer side) of the supporting plate 245a.

Figure 18:
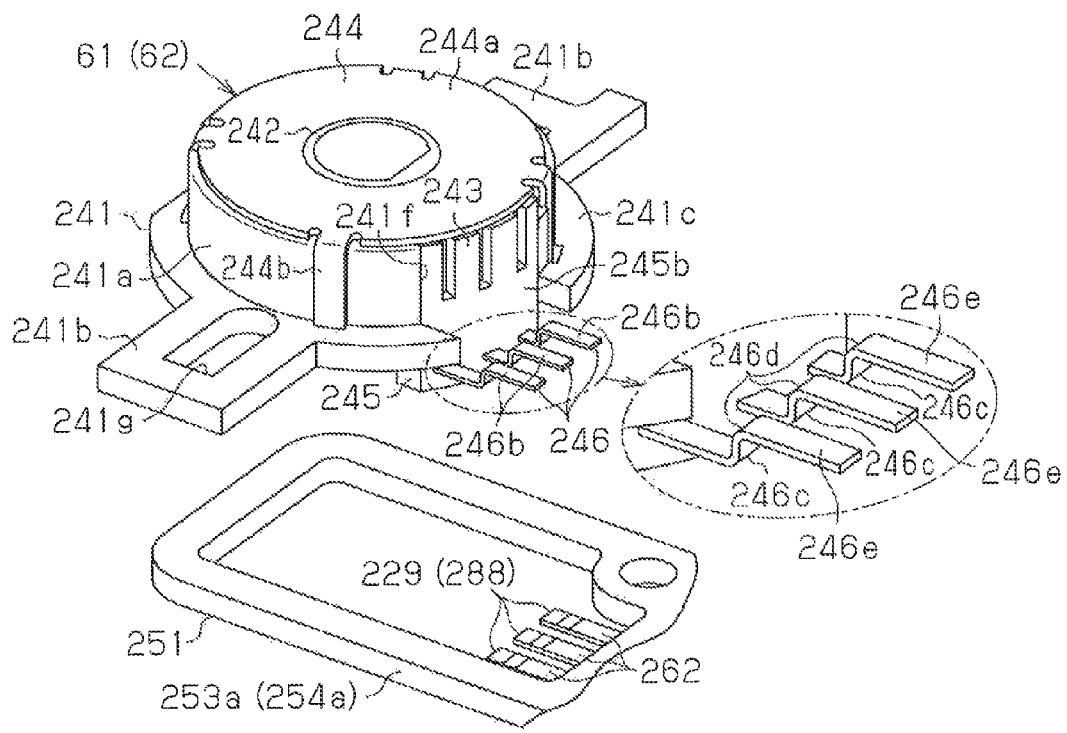
FIG. 18 is an exploded perspective view of an insulating member and the position detection sensor of FIG. 12 holding a sensor signal line.

As shown in FIG. 18, the sensor connection portion 246b of each sensor terminal 246 includes a first bent portion 246c and a second bent portion 246d obtained by bending the sensor connection portion 246b. The first bent portion 246c is obtained by bending the sensor connection portion 246b at a substantially right angle toward the basal end of the embedded holding portion 245b. In other words, the first bent portion 246c is obtained by bending the sensor connection portion 246b in a direction that is a substantially right angle relative to a plane orthogonal to the axial direction of the first position detection sensor 61. The second bent portion 246d is a portion obtained by bending the sensor connection portion 246b at a substantially right angle so that the distal end of the sensor connection portion 246b faces the outer circumferential side (radially outer side) of the supporting plate 245a at the position closer to the distal end of the sensor connection portion 246b than the first bent portion 246c. In other words, the second bent portion 246d is obtained by bending the sensor connection portion 246b in the direction that is a substantially right angle relative to a plane parallel to the axial direction of the first position detection sensor 61 at the position closer to the distal end of the sensor connection portion 246b than the first bent portion 246c. Each sensor connection portion 246b is crank shaped by including the first bent portion 246c and the second bent portion 246d. In each sensor connection portion 246b, the portion closer to the basal end than the first bent portion 246c (portion closer to the distal end of the embedded holding portion 245b than the first bent portion 246c) and the portion closer to the distal end than the second bent portion 246d are parallel. The portion closer to the distal end than the second bent portion 246d in each sensor connection portion 246b is a sensor joining portion 246e.

As shown in FIG. 17, the supporting plate 245a of the terminal member 243 described above is fitted to the opening of the accommodating portion 241a while being externally inserted to the coupling tube portion 242b of the rotation member 242. Furthermore, the embedded holding portion 245b of the terminal member 243 is fitted to the cutout 241f. The three sensor terminals 246 are held by the holding member 241 through the terminal member 243 by coupling the terminal member 243 to the holding member 241 in such manner. The contacting portions 246a of the three sensor terminals 246 are pushed and contacted in a contacting manner to the signal generating unit 242a of the rotation member 242.

The lid member 244 includes a closing portion 244a having the shape of a circular ring plate, and a plurality of (four in the second embodiment) engagement hooks 244b integrally formed at the outer circumferential edge of the closing portion 244a. The outer diameter of the closing portion 244a is slightly smaller than the outer diameter of the accommodating portion 241a, and the inner diameter of the closing portion 244a is substantially equal to the outer diameter of the coupling tube portion 242b. The four engagement hooks 244b are arranged in an extending manner from four areas at equal angular intervals in the circumferential direction at the outer circumferential edge of the closing portion 244a, and have a band shape that is longer than the axial length of the accommodating portion 241a. The lid member 244 is formed to substantially close the opening of the accommodating portion 241a with the closing portion 244a while inserting the four engagement hooks 244b to the four hook insertion holes 241h of the accommodating portion 241a. The distal end of each engagement hook 244b is extended through the accommodating portion 241a in the axial direction through the hook insertion hole 241h and then bent toward the inner circumferential side (radially inner side) at the bottom portion 241c of the accommodating portion 241a. The lid member 244 is thus fixed with to the holding member 241 by the engagement hooks 244b. The distal end of the coupling tube portion 242b is arranged at the inner side of the closing portion 244a.

Figure 20:
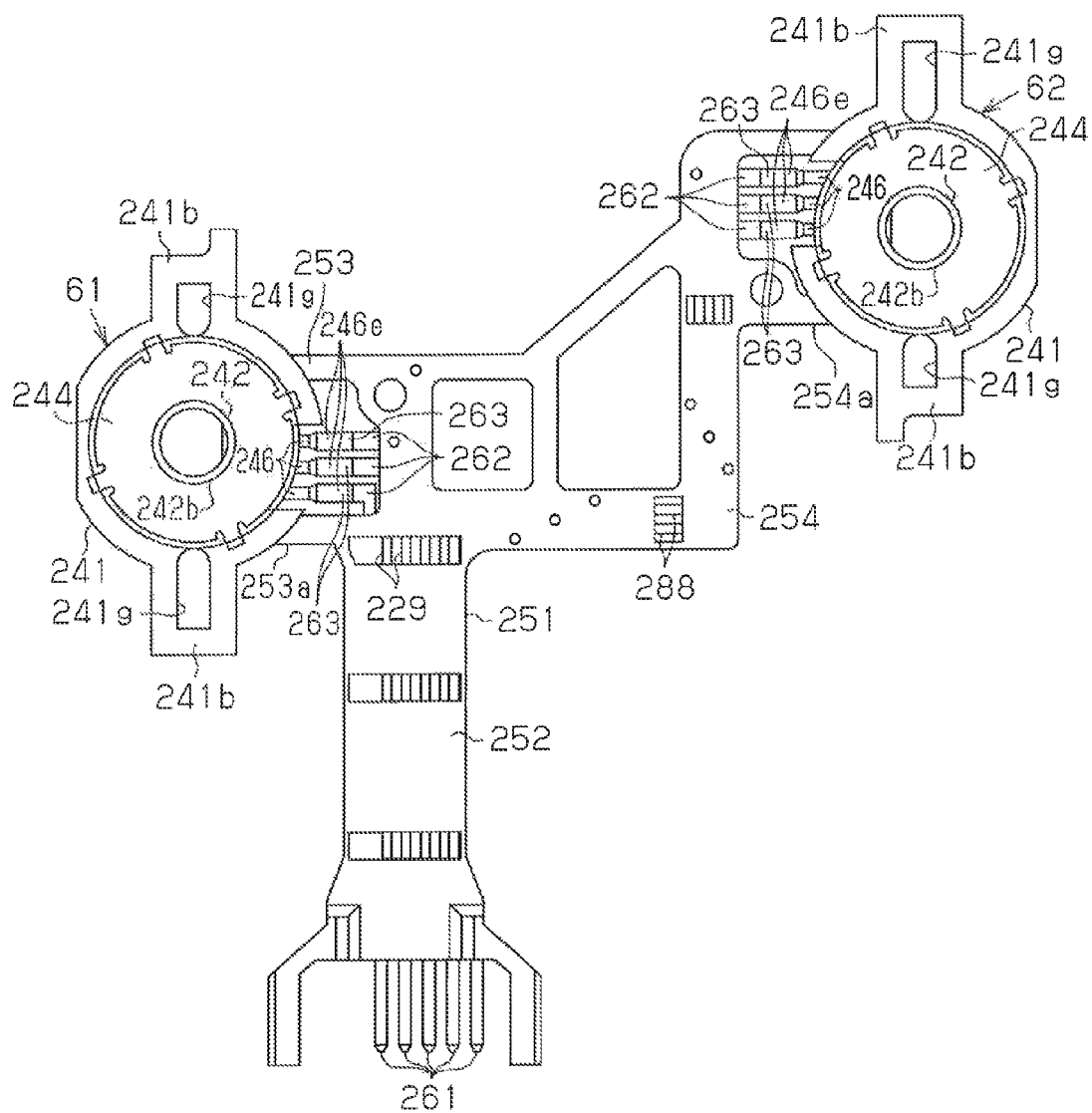
FIG. 20 is a plan view of the insulating member and the position detection sensor of FIG. 12 holding the sensor signal line.

As shown in FIGS. 12 and 20, the first sensor signal line 229 is connected to each of the three sensor terminals 246 of the first position detection sensor 61. The three first sensor signal lines 229 are arranged at a portion closer to the output gear 26 than the circuit substrate 51 at the bottom portion 11a of the first case 11. Each first sensor signal line 229 is made from a conductive metal plate material and has an elongated band shape.

As shown in FIG. 20, the three first sensor signal lines 229 are integrally formed by the insulating member 251 made from an insulative resin material. The three first sensor signal lines 229 are not integrally formed with the first power supplying terminal unit 227 by a member made from a resin material such as the insulating member 251, and the like, and are formed as separate bodies. The insulating member 251 includes a base portion 252, and a first branched portion 253 and a second branched portion 254 branched from the base portion 252. The base portion 252 has a substantially rectangular plate shape, and the first branched portion 253 and the second branched portion 254 are integrally formed at one end in the longitudinal direction of the base portion 252. As shown in FIGS. 18 and 20, a first sensor supporting portion 253a, which supports the first position detection sensor 61, is formed at the distal end of the first branched portion 253. The first sensor supporting portion 253a has a square frame shape. The width of the first sensor supporting portion 253a (width in a direction orthogonal to the projecting direction of the first sensor signal line 229 projecting to the inner side of the first sensor supporting portion 253a) is slightly smaller than the outer diameter of the accommodating portion 241a.

The third first sensor signal lines 229 are embedded and held in the base portion 252 and the first branched portion 253. The three first sensor signal lines 229 are held by the base portion 252 and the first branched portion 253 while being spaced apart by a constant interval, so that the electrical insulating property is ensured. A first end in the longitudinal direction of each of the three first sensor signal lines 229 projects from an end on the side opposite to the first branched portion 253 in the base portion 252. In each first sensor signal line 229, an end projecting from the end on the side opposite to the first branched portion 253 of the base portion 252 is a substrate connecting portion 261. A second end in the longitudinal direction of each of the three first sensor signal lines 229 projects into the first sensor supporting portion 253a from the first sensor supporting portion 253a. In each first sensor signal line 229, the portion projecting to the inner side of the first sensor supporting portion 253a is a line connection portion 262. The line connection portions 262 extend parallel at the same interval as the three sensor joining portions 246e of the first position detection sensor 61 in the first sensor supporting portion 253a.

Figure 19:
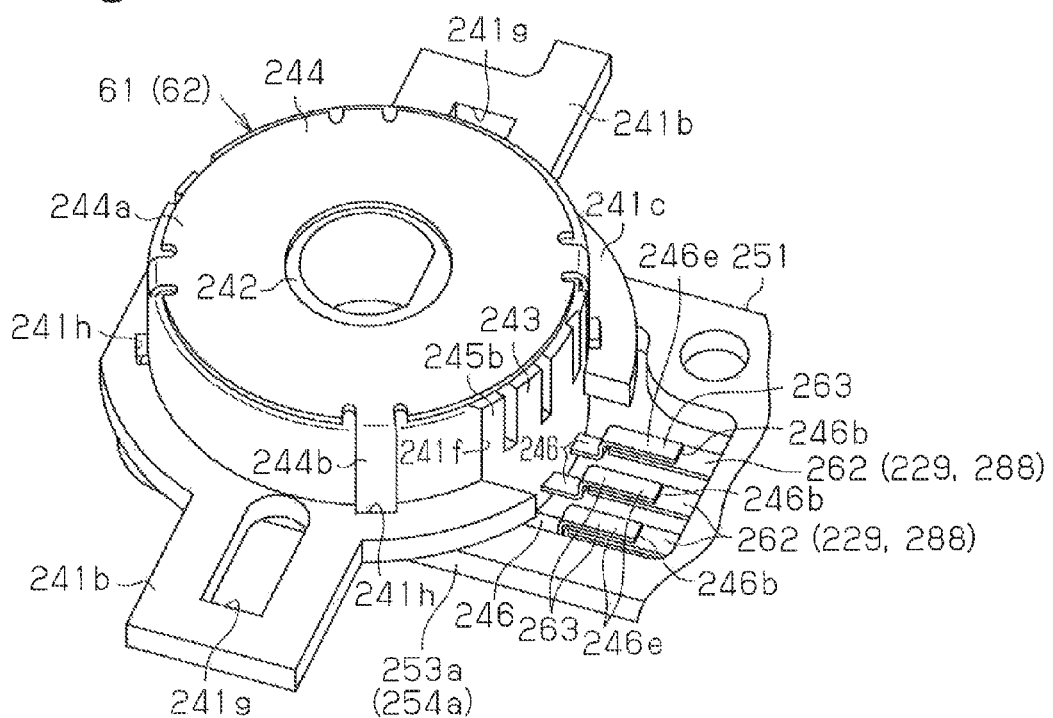
FIG. 19 is a perspective view of the insulating member and the position detection sensor of FIG. 12 holding the sensor signal line.
Figure 21:
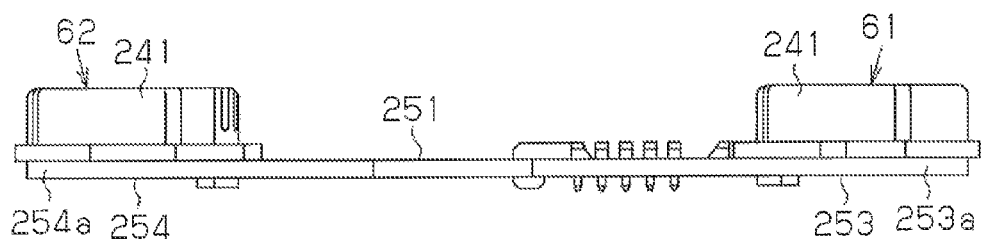
FIG. 21 is a side view of the insulating member and the position detection sensor of FIG. 12 holding the sensor signal line.

As shown in FIGS. 20 and 21, the first position detection sensor 61 is mounted on the first sensor supporting portion 253a. The three sensor connection portions 246b of the first position detection sensor 61 mounted on the first sensor supporting portion 253a respectively extend toward the connecting first sensor signal line 229, and are overlapped with the three line connection portions 262. The sensor joining portions 246e are formed so that the sensor joining portion 246e closer to the distal end than the first bent portion 246c and the second bent portion 246d is overlapped with the distal end of the connected line connection portion 262. As shown in FIG. 19, the sensor connection portion 246b (sensor joining portion 246e) and the line connection portion 262 overlapped with each other are joined by welding. A joining portion 263 where the sensor connection portion 246b and the line connection portion 262 are overlapped and joined with each other is arranged between the first bent portion 246c and the second bent portion 246d, and the distal end of the sensor connection portion 246b including the first bent portion 246c and the second bent portion 246d. The three sensor terminals 246 of the first position detection sensor 61 and the three first sensor signal lines 229 are electrically and mechanically connected by joining the sensor joining portions 246e and the line connection portions 262.

As shown in FIG. 16, the housing 10 includes a first sensor fixing portion 271 for fixing the first position detection sensor 61. The first sensor fixing portion 271 includes a pair of sensor receiving portions 273 integrally formed with the first case 11, and a pair of fixing protrusions 274 integrally formed with the second case 212.

The pair of sensor receiving portions 273 is formed at two areas on both sides in the diameter direction of the third shaft supporting portion 11n in the bottom portion 11a of the first case 11. Each sensor receiving portion 273 is cylindrical extending to the inner side of the first case 11 at a right angle relative to the bottom portion 11a of the first case 11. The outer diameter of each sensor receiving portion 273 is greater than the circumferential width of the fixing hole 241g arranged in the holding member 241 of the first position detection sensor 61. The interval between the sensor receiving portions 273 that form a pair is substantially equal to the interval between a pair of fixing holes 241g in the first position detection sensor 61.

The pair of fixing protrusions 274 is formed at positions facing the pair of sensor receiving portions 273 in the upper bottom portion 212a of the second case 212. Each fixing protrusion 274 is cylindrical and extends into the second case 212 (inner side of the housing 10) at a right angle relative to the upper bottom portion 212a of the second case 212. The outer diameter of each fixing protrusion 274 is greater than the circumferential width of the fixing hole 241g. A squeezing portion 274a having a conical shape, of which the diameter becomes smaller toward the distal end of the fixing protrusion 274, is formed at the distal end of each fixing protrusion 274.

Procedures for coupling the first position detection sensor 61 to the housing 10 will now be described. As shown in FIGS. 12 and 21, the first position detection sensor 61 is first arranged on the bottom portion 11a of the first case 11 with the first sensor signal line 229 and the insulating member 251 while being mounted on the first sensor supporting portion 253a of the insulating member 251 integrally formed with and holding a plurality of first sensor signal lines 229. The substrate connecting portion 261 of the first sensor signal line 229 arranged on the bottom portion 11a of the first case 11 is connected to the circuit substrate 51. Thus, the three first sensor signal lines 229 are electrically connected to the corresponding signal connector terminals 235 through the circuit substrate 51. The first power supplying terminal unit 227 and the first sensor signal line 229 are not integrally formed (integrally formed while ensuring the electrical insulating property) by the resin material. Furthermore, the circuit substrate 51 including the first power supplying terminal unit 227 and the first sensor signal line 229 held by the insulating member 251 are not integrally formed by the resin material. Thus, the circuit substrate 51, including the first power supplying terminal unit 227, and the first sensor signal line 229 are separately coupled to the bottom portion 11a of the first case 11. In other words, the circuit substrate 51 and the first sensor signal line 229 are coupled to the first case 11, and the first sensor signal line 229 is then connected to the circuit substrate 51.

As shown in FIG. 16, the pair of fixed portions 241b of the first position detection sensor 61 arranged on the bottom portion 11a of the first case 11 while being mounted on the first sensor supporting portion 253a are arranged on the pair of sensor receiving portions 273. In this state, the fixing holes 241g of the pair of fixed portions 241b and the distal end faces of the pair of sensor receiving portions 273 are arranged in the opposing direction of the bottom portion 11a of the first case 11 and the upper bottom portion 12a of the second case 12. The supporting shaft 26c of the output gear 26 is then inserted into the coupling tube portion 242b so that the rotation member 242 and the output gear 226 are coupled in an integrally rotatable manner, and the distal end of the supporting shaft 26c is internally inserted to the third shaft supporting portion 11n so that the output gear 226 is axially supported by the third shaft supporting portion 11n.

The second case 12 is overlapped on the first case 11 in this state, and eight engagement pieces 12c of the second case 12 are snap-fitted and engaged with the eight engagement projections 11c of the first case 11. At the same time, the squeezing portions 274a of the pair of fixing protrusions 274 are inserted into the opposing fixing holes 241g, and also pushed against and squeezed by the distal end face of the opposing sensor receiving portion 273. The fixed portion 241b is sandwiched between the distal end of the sensor receiving portion 273 and the distal end of the fixing protrusion 274 opposing each other. In other words, the opposing sensor receiving portion 273 and the pair of fixing protrusions 274 sandwich and fix the fixed portion 241b in the coupling direction of the first case 11 and the second case 12. The holding member 241 is thus supported by the pair of sensor receiving portions 273 and the pair of fixing protrusions 274. Rotation of the holding member 241 is inhibited along the circumferential direction of the output gear 226 inside the housing 10 by the first sensor fixing portion 271 including the pair of sensor receiving portions 273 and the pair of fixing protrusions 274. The first position detection sensor 61 is fixed to the housing 10 by the first sensor fixing portion 271 in such manner.

As shown in FIG. 12, in the first output mechanism 21 described above, the rotation of the rotation shaft 22b is transmitted to the worm 23 when the motor 22 is activated. The rotation transmitted to the worm 23 is transmitted while being decelerated in the order of the first deceleration gear 24, the second deceleration gear 25, and the output gear 26. The rotation transmitted to the output gear 26 is output from the output shaft portion 26a, and the blower duct switching door is driven through the link mechanism coupled to the output shaft portion 26a.

When the output gear 26 is rotated, the rotation member 242 of the first position detection sensor 61 rotates integrally and coaxially with the output gear 26. The first position detection signal (position detection signal), which is an electric signal corresponding to the rotation position of the output gear 26, is then output from the sensor terminal 246 of the first position detection sensor 61. The first position detection signal is transmitted to the drive IC 91 through the first sensor signal line 229. The drive IC 91 controls the power supply to the motor 22 based on the electric signal input from the external device through the external connector and the first position detection signal.

The second output mechanism 31 of the second embodiment includes the motor 32, the worm 33, the output gear 34, the sensor output shaft portion 35, the second power supplying terminal unit 286, the second position detection sensor 287, and the second sensor signal line 288.

As shown in FIGS. 12 and 14, the motor 32 has the same shape as the motor 22 forming the first output mechanism 21. In other words, the motor 32 includes a cylindrical housing case 32a having closed ends. The rotation shaft 32b of the motor 32 projects from the middle of the first end face in the axial direction of the housing case 32a, and the pair of motor power supplying terminals 32d for receiving the supply of power is arranged at the second end face in the axial direction of the housing case 32a.

As shown in FIG. 12, the sensor output shaft portion 35 is arranged at a position spaced apart from the output gear 34 inside the housing 10. The sensor output shaft portion 35 has a substantially circular plate shape, and includes a coupling shaft 35a at the central part in the radial direction thereof. The coupling shaft 35a is rod-shaped and extends in a direction of the rotation axis L2 extending in the axial direction of the sensor output shaft portion 35. Furthermore, a supporting shaft (not shown) extending in a direction opposite to the coupling shaft 35a along the direction of the rotation axis L2 of the sensor output shaft portion 35 is formed at the central part in the radial direction of the sensor output shaft portion 35. The supporting shaft has a shape similar to the supporting shaft 26c of the output gear 26, and is rod-shaped and has a substantially D-shaped cross-section.

As shown in FIGS. 12 and 15, the fifth shaft supporting portion 11u of the second embodiment projects from the bottom portion 11a of the first case 11 perpendicular to the bottom portion 11a, and has a circular ring shape. The sensor output shaft portion 35 is rotatably supported by the fifth shaft supporting portion 11u by inserting the distal end of the supporting shaft to the inner side of the fifth shaft supporting portion 11u. In other words, the sensor output shaft portion 35 is rotatably supported by the housing 10 including the fifth shaft supporting portion 11u. The rotation axis L2 of the sensor output shaft portion 35 is parallel to the rotation axis L1 of the output gear 26 of the first output mechanism 21.

Figure 13:
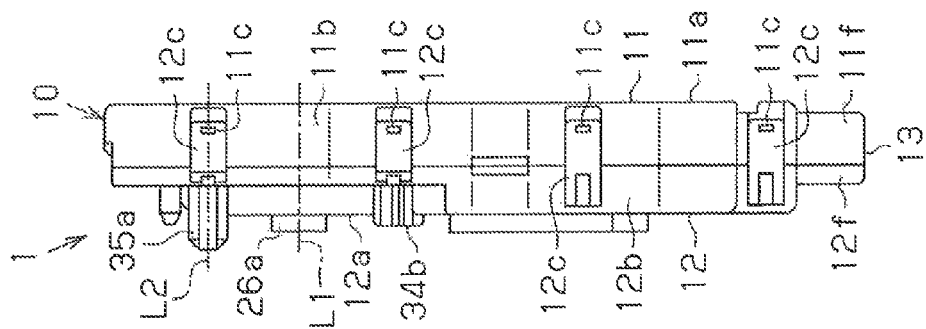
FIG. 13 is a side view of the motor actuator of FIG. 12.

As shown in FIG. 13, the sensor output shaft portion 35 axially supported by the fifth shaft supporting portion 11u extends through the upper bottom portion 12a of the second case 12 and projects to the exterior of the housing 10. As shown in FIG. 12, the link member 41 forming the link mechanism for activating the blower duct switching door is coupled to the coupling shaft 35a projecting to the exterior of the housing 10. The link member 41 has a circular gear shape. The link member 41 is coupled to the coupling shaft 35a at the central part in the radial direction of the link member, and rotates integrally and coaxially with the sensor output shaft portion 35. The link member 41 coupled to the sensor output shaft portion 35 is arranged outside the housing 10, and is engaged with the small diameter gear 34b of the output gear 34 outside the housing 10. In other words, the output gear 34 is coupled to the blower duct switching door by the link mechanism including the link member 41.

The second power supplying terminal unit 286 is arranged on the circuit substrate 51. The second power supplying terminal unit 286 includes the pair of second power supplying terminals 82 and the pair of power supplying connector terminals 234. That is, the power supplying connector terminal 234 includes both the first power supplying terminal unit 227 of the first output mechanism 21 and the second power supplying terminal unit 286 of the second output mechanism 31.

As shown in FIGS. 12 and 14, the pair of second power supplying terminals 82 is arranged in an upright manner on the circuit substrate 51 near the end in the axial direction where the pair of motor power supplying terminals 32d is arranged in the motor 32. The pair of second power supplying terminals 82 is pressed against the pair of motor power supplying terminals 32d to be electrically connected to the motor power supplying terminals 32d. The pair of second power supplying terminals 82 is electrically connected to the pair of power supplying connector terminals 234 by way of the circuit substrate 51.

As shown in FIG. 12, the second position detection sensor 62 for detecting the rotation position of the output gear 34 engaged with the link member 41 that integrally rotates with the sensor output shaft portion 35 is attached to the sensor output shaft portion 35. As shown in FIG. 17, the second position detection sensor 62 has the same structure as the first position detection sensor 61, and includes the holding member 241, the rotation member 242, the terminal member 243, and the lid member 244. The structure of the second position detection sensor 62 is the same as the first position detection sensor 61.

As shown in FIGS. 12 and 20, three second sensor signal lines 288 are connected to the three sensor terminals 246 of the second position detection sensor 62. The three second sensor signal lines 288 are arranged at portions closer to the sensor output shaft portion 35 than the circuit substrate 51 in the bottom portion 11a of the first case 11. Each second sensor signal line 288 is made from a conductive metal plate material, and has an elongated band shape.

The three second sensor signal lines 288 are integrally formed by the insulating member 251. The three second sensor signal lines 288 are not integrally formed with the second power supplying terminal unit 286 by the member made of resin material such as the insulating member 251, and are formed as separate bodies. A second sensor supporting portion 254a, which supports the second position detection sensor 62, is formed at the distal end of the second branched portion 254 of the insulating member 251. The second sensor supporting portion 254a has the same square frame shape as the first sensor supporting portion 253a. The three second sensor signal lines 288 are embedded and held by the base portion 252 and the second branched portion 254. The three second sensor signal lines 288 are held by the base portion 252 and the second branched portion 254 while being spaced apart by a constant interval, so that the electrical insulating property is ensured. In other words, the first sensor signal line 229 of the first output mechanism 21 and the second sensor signal line 288 of the second output mechanism 31 are integrally formed by the insulating member 251. Furthermore, the first sensor signal line 229 and the second sensor signal line 288 are held with the electrical insulating property ensured by the insulating member 251.

The first end in the longitudinal direction of each of the three second sensor signal lines 288 projects from the end on the side opposite to the second branched portion 254 of the base portion 252. In each second sensor signal line 288, the end projecting from the end on the side opposite to the second branched portion 254 of the base portion 252 is the substrate connecting portion 261. Furthermore, the second end in the longitudinal direction of each of the three second sensor signal lines 288 projects into the second sensor supporting portion 254a. In each second sensor signal line 288, the portion projecting to the inner side of the second sensor supporting portion 254a is the line connection portion 262. The line connection portions 262 extend parallel at the same interval as the three sensor joining portions 246e of the second position detection sensor 287 at the inner side of the second sensor supporting portion 254a. One second sensor signal line 288 of the three second sensor signal lines 288 and one first sensor signal line 229 of the three first sensor signal lines 229 of the present embodiment are integrated in midway from the line connection portion 262 to the substrate connecting portion 261.

As shown in FIGS. 20 and 21, the second position detection sensor 62 is mounted on the second sensor supporting portion 254a. The three sensor joining portions 246e of the second position detection sensor 62 mounted on the second sensor supporting portion 254a are overlapped with the three line connection portions 262. As shown in FIG. 19, the sensor joining portion 246e and the line connection portion 262 that are overlapped with each other are joined by welding. When the sensor joining portion 246e and the line connection portion 262 are joined, the three sensor terminals 246 of the second position detection sensor 287 and the three second sensor signal lines 288 are electrically and mechanically connected.

As shown in FIGS. 15 and 16, the housing 10 includes the second sensor fixing portion 272 for fixing the second position detection sensor 62. The second sensor fixing portion 272 has the same shape as the first sensor fixing portion 271, and includes a pair of sensor receiving portions 273 integrally formed with the first case 11 and a pair of fixing protrusions 274 integrally formed with the second case 12. The pair of sensor receiving portions 273 is formed at two areas on both sides in the diameter direction of the fifth shaft supporting portion 11u at the bottom portion 11a of the first case 11. The pair of fixing protrusions 274 are formed at positions facing the pair of sensor receiving portions 273 in the upper bottom portion 12a of the second case 12. The shapes of the sensor receiving portion 273 and the fixing protrusion 274 of the second sensor fixing portion 272 are the same as the shapes of the sensor receiving portion 273 and the fixing protrusion 274 of the first sensor fixing portion 271 and thus will not be described in detail.

As shown in FIGS. 16 and 20, the second position detection sensor 62 is fixed to the housing 10 by the second sensor fixing portion 272 at the same time as the first position detection sensor 61 through procedures similar to the first position detection sensor 61 described above. The second power supplying terminal unit 286 and the second sensor signal line 288 are not integrally formed (integrally formed while ensuring electrical insulating property) by the resin material. The circuit substrate 51 including the second power supplying terminal unit 286 and the second sensor signal line 288 held by the insulating member 251 are not integrally formed by the resin material. The circuit substrate 51 including the second power supplying terminal unit 286 and the second sensor signal line 288 are thus separately coupled to the bottom portion 11a of the first case 11. In other words, the circuit substrate 51 and the second sensor signal line 288 are coupled to the first case 11. Then, the second sensor signal line 288 is connected to the circuit substrate 51. In the second position detection sensor 62 fixed to the housing 10 by the second sensor fixing portion 272, the fixed portion 241b is sandwiched between the distal end of the sensor receiving portion 273 and the distal end of the fixing protrusion 274 opposing each other. The holding member 241 is thereby supported by the pair of sensor receiving portions 273 and the pair of fixing protrusions 274. The holding member 241 of the second position detection sensor 62 has the rotation in the circumferential direction of the sensor output shaft portion 35 inhibited by the second sensor fixing portion 272 inside the housing 10. Since each substrate connecting portion 261 is connected to the circuit substrate 51, the second sensor signal line 288 arranged on the bottom portion 11a of the first case 11 with the insulating member 251 is electrically connected to the corresponding signal connector terminal 235 by the circuit substrate 51.

As shown in FIG. 12, in the second output mechanism 31 described above, the rotation of the rotation shaft 32b is transmitted to the worm 33 when the motor 32 is activated. The rotation transmitted to the worm 33 is output from the small diameter gear 34b of the output gear 34. This rotates the link member 41 engaged with the small diameter gear 34b of the output gear 34, and the blower duct switching door is driven by the link mechanism including the link member 41.

In this case, the link member 41 integrally rotates with the sensor output shaft portion 35 while being supported by the sensor output shaft portion 35. Therefore, the rotation of the motor 32 transmitted to the output gear 34 is transmitted to the sensor output shaft portion 35 through the link member 291. The rotation member 242 of the second position detection sensor 62 rotates integrally and coaxially with the sensor output shaft portion 35 as the sensor output shaft portion 35 rotates. The electrical signal corresponding to the rotation position of the rotation member 242, that is, the second position detection signal (position detection signal) corresponding to the rotation position of the output gear 34, is then output from the sensor terminal 246 of the second position detection sensor 62. The electric signal is transmitted to the drive IC 91 through the second sensor signal line 288. The drive IC 91 controls the power supply to the motor 32 based on the electric signal input from the external device through the external connector and the second position detection signal.

In the second output mechanism 31, the deceleration gear of the final stage corresponds to the sensor output shaft portion 35, which is the last component rotatably supported by the housing 10 and to which the rotation of the motor 32 is transmitted.

The operation of the motor actuator 1 will now be described.

The first sensor signal line 229 of the first output mechanism 21 and the second sensor signal line 288 of the second output mechanism 31 are integrally formed by the insulating member 251. Therefore, the first sensor signal line 229 and the second sensor signal line 288 are arranged on the bottom portion 11a of the first case 11 at the same time as the insulating member 251. In other words, the first sensor signal line 229 and the second sensor signal line 288 can be simultaneously coupled to the housing 10.

Generally, if the sensor signal lines 229, 288 of the two output mechanisms 21, 31 and the power supplying terminal units 227, 286 of the two output mechanisms 21, 31 are integrally formed by a resin material, the positional relationship of the sensor signal lines 229, 288 and the power supplying terminal units 227, 286 is determined by the resin material before being coupled to the housing 10. In this case, however, the number of components integrally formed (i.e., the sensor signal lines 229, 288 and the power supplying terminal units 227, 286) is large and the distance between some components may become large. Thus, the position accuracy of the components becomes difficult to maintain. When the integrally formed sensor signal lines 229, 288 and the power supplying terminal units 227, 286 are coupled to the housing 10, the position shift of the sensor signal lines 229, 288 and the power supplying terminal units 227, 286 may become large. Furthermore, to perform the integral formation while maintaining a high position accuracy of the sensor signal lines 229, 288 and the power supplying terminal units 227, 286, the manufacturing cost becomes high. Conventionally, the distance of the sensor signal line and the power supplying terminal unit is short, and the position accuracy is easily maintained even if the sensor signal line and the power supplying terminal unit are integrally formed by a resin material since only one output mechanism is accommodated in one housing. By forming the integrally formed sensor signal lines 229, 288 and the power supplying terminal units 227, 286 as separate bodies without integrally forming a resin material like in the present embodiment, displacement of the power supplying terminals 81, 82 of the power supplying terminal units 227, 286 is suppressed relative to the motor power supplying terminals 22d, 32d in each output mechanism 21, 31 while facilitating the coupling of the sensor signal lines 229, 288 of the two output mechanisms 21, 31. Displacement of the sensor signal lines 229, 288 can also be suppressed.

In conventional motor actuators, the position detection sensor and the sensor signal line are integrally formed with a resin material. In the motor actuator 1 in which two output mechanisms 21, 31 are accommodated in one housing 10, the sensor signal lines 229, 288 and the position detection sensors 61, 62 may be integrally formed by integrating the holding member 241 and the insulating member 251. In this case, the positional relationship of the sensor signal lines 229, 288 and the position detection sensors 61, 62 is determined by the integrated holding member 241 and the insulating member 251 before being coupled to the housing 10. However, the number of components integrally formed (i.e., the sensor signal lines 229, 288 and the position detection sensors 61, 62) becomes large and the distance between some components may become large. Thus, the position accuracy of the components becomes difficult to maintain. When the integrally formed sensor signal lines 229, 288 and the position detection sensors 61, 62 are coupled to the housing 10, the position shift of the sensor signal lines 229, 288 and the position detection sensors 61, 62 may become large. In the housing 10, when the position detection sensors 61, 62 are displaced by displacement of the sensor signal lines 229, 288, the rotation member 242 of the first position detection sensor 28 may be displaced relative to the output gear 26 and the rotation member 242 of the second position detection sensor 62 may be displaced relative to the sensor output shaft portion 35. In other words, the rotation axis L1 of the output gear 26 and the rotation axis of the rotation member 242 coupled to the output gear 26 may shift, and the rotation axis L2 of the sensor output shaft portion 35 and the rotation axis of the rotation member 242 attached to the sensor output shaft portion 35 may shift. An excessively large load, such as friction force and the like, may then act on the output gear 26 or the sensor output shaft portion 35 from the rotation member 242, the housing 10, and the like thereby generating abnormal noise or causing output loss. When integrally forming the sensor signal lines 229, 288 and the position detection sensors 61, 62, the manufacturing cost becomes high when performing integral formation while maintaining a high position accuracy of the sensor signal lines 229, 288 and the position detection sensors 61, 62. Conventionally, the distance of the sensor signal line and the position detection sensor is short, and the position accuracy can be easily maintained even if the sensor signal line and the position detection sensor are integrally formed by a resin material since only one output mechanism is accommodated in one housing. Thus, displacement of the position detection sensors 61, 62 can be suppressed in each output mechanism 21, 31 while facilitating coupling of the sensor signal lines 229, 288 by forming the holding member 241 and the insulating member 251 as separate bodies like in the present embodiment. Furthermore, in the first output mechanism 21, the first position detection sensor 61 is connected to the first sensor signal line 229 by joining the sensor terminal 246 and the first sensor signal line 229. In the same manner, in the second output mechanism 31, the second position detection sensor 62 is connected to the second sensor signal line 288 by joining the sensor terminal 246 and the second sensor signal line 288. Therefore, displacement of the sensor signal lines 229, 288 can be absorbed and displacement of the position detection sensors 61, 62 can be suppressed at the portion joining the sensor terminal 246 and the first sensor signal line 229 with the joining portion of the sensor terminal 246 and the second sensor signal line 288. Furthermore, displacement of the sensor signal lines 229, 288 can also be suppressed by forming the holding member 241 and the insulating member 251 as separate bodies.

In the position detection sensor 61, 62 of each output mechanism 21, 31, the holding member 241 is fixed to the housing 10 by being sandwiched by the first sensor fixing portion 271 or the second sensor fixing portion 272 when overlapping and fixing the first case 11 and the second case 12. Therefore, the final positioning of the holding member 241 holding the rotation member 242 with respect to the housing 10 is carried out when overlapping and fixing the first case 11 and the second case 12. The output gear 26 attached with the first position detection sensor 61 and the sensor output shaft portion 35 attached with the second position detection sensor 62 are coupled to the interior of the first case 11 before overlapping the first case 11 and the second case 12. Therefore, the holding member 241 of the first position detection sensor 61 has the position in the diameter direction of the output gear 26 (diameter direction of the accommodating portion 241a) relative to the output gear 26 adjusted by the sandwiching position of the fixed portion 241b by the first sensor fixing portion 271. In the same manner, the holding member 241 of the second position detection sensor 287 has the position in the diameter direction of the sensor output shaft portion 35 (diameter direction of the accommodating portion 241a) relative to the sensor output shaft portion 35 adjusted by the sandwiching position of the fixed portion 241b by the second sensor fixing portion 272. Thus, the holding member 241 can be fixed to the housing 10 with the rotation member 242 held by the holding member 241 arranged at the position corresponding to the position of the output gear 26 in the first position detection sensor 61. In the same manner, the holding member 241 can be fixed to the housing 10 with the rotation member 242 held by the holding member 241 arranged at the position corresponding to the position of the sensor output shaft portion 35 in the second position detection sensor 287.

As described above, the second embodiment has the advantages described below.

(7) Since the sensor signal lines 229, 288 of the two output mechanisms 21, 31 are integrally formed, the number of components is reduced and the plurality of sensor signal lines 229, 288 are coupled to the housing 10 all at once. Therefore, the motor actuator 1 in which two output mechanisms 21, 31 are accommodated inside one housing 1 is easily assembled.

(8) Although the sensor signal lines 229, 288 of the two output mechanisms 21, 31 are integrally formed, the sensor signal lines 229, 288 and the power supplying terminal units 227, 286 of the two output mechanisms 21, 31 are formed as separate bodies. Thus, displacement of the first power supplying terminal 81 of the first power supplying terminal unit 227 is suppressed relative to the motor power supplying terminal 22d in the first output mechanism 21, and displacement of the second power supplying terminal 82 of the second power supplying terminal unit 286 is suppressed relative to the motor power supplying terminal 32d in the second output mechanism 31 while facilitating the coupling of the sensor signal lines 229, 288 by forming the integrally formed sensor signal lines 229, 288 and the power supplying terminal units 227, 286 as separate bodies without being integrally formed with the resin material. Thus, the motor power supplying terminal 22d and the first power supplying terminal 81, and the motor power supplying terminal 32d and the second power supplying terminal 82 are connected in a satisfactory manner. As a result, each motor 22, 32 is also supplied with power in a satisfactory manner. Displacement of the sensor signal lines 229, 288 is also suppressed.

(9) Displacement of the position detection sensors 61, 62 are suppressed in each output mechanism 21, 31 while facilitating the coupling of the sensor signal lines 229, 288 by forming the holding member 241 and the insulating member 251 as separate bodies. In the first output mechanism 21, the first position detection sensor 61 is connected to the first sensor signal line 229 by joining the sensor terminal 246 and the first sensor signal line 229. In the same manner, in the second output mechanism 31, the second position detection sensor 287 is connected to the second sensor signal line 288 by joining the sensor terminal 246 and the second sensor signal line 288. Therefore, displacement of the sensor signal lines 229, 288 is absorbed, and displacement of the position detection sensors 61, 62 is suppressed at the joining portion of the sensor terminal 246 and the first sensor signal line 229 and at the joining portion of the sensor terminal 246 and the second sensor signal line 288. Furthermore, displacement of the sensor signal lines 229, 288 is suppressed by forming the holding member 241 and the insulating member 251 as separate bodies. Shifting of the rotation axis L1 of the output gear 26 and the rotation axis of the rotation member 242 attached to the output gear 26 are suppressed, and shifting of the rotation axis L2 of the sensor output shaft portion 35 and the rotation axis of the rotation member 242 attached to the sensor output shaft portion 35 are suppressed by suppressing displacement of the position detection sensors 61, 62. As a result, generation of abnormal noise and occurrence of output loss are suppressed.

(10) In the first output mechanism 21, displacement of the position detection sensor 61 and the first sensor signal line 229 that occurs after being coupled to the housing 10 is absorbed by the first bent portion 246c and the second bent portion 246d. Furthermore, in the second output mechanism 31, displacement of the position detection sensor 62 and the second sensor signal line 288 that occurs after being coupled to the housing 10 is absorbed by the first bent portion 246c and the second bent portion 246d. In the second embodiment, the first bent portion 246c is obtained by bending the sensor connection portion 246b in a direction that is substantially a right angle relative to a plane orthogonal to the axial direction of the position detection sensor 61, 62 in each position detection sensor 61, 62. Furthermore, the second bent portion 246d is obtained by bending the sensor connection portion 246b in a direction that is substantially a right angle relative to a plane parallel to the axial direction of the position detection sensors 61, 62 at the position that is closer to the distal end of the sensor connection portion 246b than the first bent portion 246c. Thus, displacement in the axial direction and the radial direction of the position detection sensors 61, 62 of the position detection sensor 61, 62 and the line connection portion 262 are easily absorbed by the first bent portion 246c and the second bent portion 246d. This reduces stress at the joining portion 263 of the sensor connection portion 246b and the line connection portion 262 due to displacement between the first position detection sensor 61 and the first sensor signal line 229 connected with the sensor terminal 246. In the same manner, stress is reduced at the joining portion 263 of the sensor connection portion 246b and the line connection portion 262 due to displacement between the second position detection sensor 62 and the second sensor signal line 288 connected with the sensor terminal 246. Therefore, the connecting state of the sensor connection portion 246b and the line connection portion 262 becomes stable. Furthermore, in the first output mechanism 21, the position shift of the first sensor signal line 229 is suppressed from being transmitted to the member closer to the first position detection sensor 61 than the first bent portion 246c and the second bent portion 246d. In the same manner, in the second output mechanism 31, the position shift of the second sensor signal line 288 is suppressed from being transmitted to the member closer to the second position detection sensor 62 than the first bent portion 246c and the second bent portion 246d. Therefore, shifting of the rotation axis L1 of the output gear 26 and the rotation axis of the rotation member 242 attached to the output gear 26 is suppressed, and shifting of the rotation axis L2 of the sensor output shaft portion 35 and the rotation axis of the rotation member 242 attached to the sensor output shaft portion 35 is suppressed. As a result, the generation of abnormal noise and the occurrence of output loss are further suppressed.

(11) Each position detection sensor 61, 62 is arranged on the insulating member 251. Thus, the insulating member 251 is coupled to the housing 10 with all of the position detection sensors 61, 62 arranged on the insulating member 251. Therefore, the two position detection sensors 61, 62 and the insulating member 251 are coupled to the housing 10 all at once. Thus, the motor actuator 1 in which two output mechanisms 21, 31 are accommodated inside one housing 10 is more easily assembled.

(12) In the position detection sensor 61, 62 of each output mechanism 21, 31, the holding member 241 is sandwiched and fixed by the first sensor fixing portion 271 or the second sensor fixing portion 272 when overlapping and fixing the first case 11 and the second case 12. Therefore, the holding member 241 is fixed to the housing 10 with the rotation member 242 held by the holding member 241 arranged at a position corresponding to the position of the output gear 26 in the first position detection sensor 61. In the same manner, the holding member 241 is fixed to the housing 10 with the rotation member 242 held by the holding member 241 arranged at a position corresponding to the position of the sensor output shaft portion 35 in the second position detection sensor 62. Therefore, displacement of the first position detection sensor 61 relative to the output gear 26 and displacement of the second position detection sensor 62 relative to the sensor output shaft portion 35 are further reduced. In other words, displacement of the rotation axis L1 of the output gear 26 and the rotation axis of the rotation member 242 attached to the output gear 26 are further suppressed, and displacement of the rotation axis L2 of the sensor output shaft portion 35 and the rotation axis of the rotation member 242 attached to the sensor output shaft portion 35 are further suppressed. As a result, generation of abnormal noise and occurrence of output loss are further suppressed. Since the holding member 241 is fixed to the housing 10 at the same time as when fixing the first case 11 and the second case 12, the motor actuator 1 is further easily assembled.

The second embodiment of the present invention may be modified as described below.

In the second embodiment, the position where the fixed portion 241b is sandwiched by the first sensor fixing portion 271 adjusts the position of the holding member 241 of the first position detection sensor 61 in the diameter direction of the output gear 26 (diameter direction of the accommodating portion 241a) with respect to the output gear 26. In the same manner, the position where the fixed portion 241b is sandwiched by the second sensor fixing portion 272 adjusts the position of the holding member 241 of the second position detection sensor 62 in the diameter direction of the sensor output shaft portion 35 (diameter direction of the accommodating portion 241a) with respect to the sensor output shaft portion 35. However, the position of the fixed portion 241b of the first position detection sensor 28 sandwiched by the first sensor fixing portion 271 and the position of the fixed portion 241b of the second position detection sensor 287 sandwiched by the second sensor fixing portion 272 do not necessarily have to be adjustable.

In the second embodiment, when overlapping and fixing the first case 11 and the second case 12, the holding member 241 of the first position detection sensor 61 is fixed to the housing by the first sensor fixing portion 271, and the holding member 241 of the second position detection sensor 62 is fixed to the housing 10 by the second sensor fixing portion 272. However, the structure for fixing the holding member 241 of each position detection sensor 61, 62 to the housing 10 is not limited to the structure of the second embodiment. For example, the holding member 241 of each position detection sensor 61, 62 may simply be fixed to the bottom portion 11a of the first case 11.

In the second embodiment, the position detection sensor 61, 62 of each output mechanism 21, 31 are both arranged on the insulating member 251. However, the position detection sensor 61, 62 does not necessarily have to be arranged on the insulating member 251. In this case, the position detection sensors 61, 62 and the sensor signal lines 229, 288 are each coupled to the housing 10.

In the second embodiment, the first bent portion 246c and the second bent portion 246d are arranged in the sensor connection portion 246b. However, the first bent portion 246c and the second bent portion 246d may be arranged in the line connection portion 262. The first bent portion 246c and the second bent portion 246d may be arranged on both the sensor connection portion 246b and the line connection portion 262. The number of bent portions formed in at least one of the sensor connection portion 246b and the line connection portion 262 is not limited to two, and may be one or three or more. The direction the sensor connection portion 246b is bent by the bent portion or the direction the line connection portion 262 is bent by the bent portion are not limited to the direction of the second embodiment, and may be any direction. The sensor connection portion 246b and the line connection portion 262 do not necessarily include the bent portion.

In the second embodiment, the holding member 241 and the insulating member 251 are formed as separate bodies. However, the holding member 241 and the insulating member 251 may be integrated.

In the second embodiment, the first sensor signal line 229 and the second sensor signal line 288 are integrally formed by the insulating member 251 made of insulative resin material. However, the structure of the insulating member 251 is not limited in such a manner. For example, the insulating member 251 may be a circuit substrate. In this case, the first sensor signal line 229 and the second sensor signal line 288 are formed on the circuit substrate.

In the second embodiment, the sensor signal lines 229, 288 and the power supplying terminal units 227, 286 are formed as separate bodies but do not necessarily have to be formed as separate bodies. For example, the sensor signal lines 229, 288 and the power supplying terminals 81, 82 of the power supplying terminal units 227, 286 may be integrally formed while ensuring the electrical insulating property by a member made of insulative resin material (including insulating member 251).

In the second embodiment, the pair of first power supplying terminals 81 and the pair of power supplying connector terminals 234 forming the first power supplying terminal unit 227 are electrically connected by the circuit substrate 51. In the same manner, the pair of second power supplying terminals 82 and the pair of power supplying connector terminals 234 forming the second power supplying terminal unit 286 are electrically connected by the circuit substrate 51. However, in the first power supplying terminal unit 227, the pair of first power supplying terminals 81 and the pair of power supplying connector terminals 234 may be integrally formed with the insulative resin material, and the first power supplying terminals 81 and the power supplying connector terminals 234 may be directly joined. In this case, in the second power supplying terminal unit 286, the pair of second power supplying terminals 82 and the pair of power supplying connector terminals that differ from the power supplying connector terminals 234 of the first power supplying terminal unit 227 are integrally formed with the insulative resin material, and the second power supplying terminals 82 and the power supplying connector terminals are directly joined.

In the second embodiment, the motor actuator 1 includes the drive IC 91. However, the motor actuator 1 does not have to include the drive IC 91. In this case, operation of the motor actuator 1 is controlled by the externally arranged control unit. The first position detection signal is transmitted toward the control unit through the first sensor signal line 229 and the signal connector terminal 235, and the second position detection signal is transmitted toward the control unit through the second sensor signal line 288 and the signal connector terminal 235.

The first position detection sensor 61 and the second position detection sensor 62 are not limited to the structures of the second embodiment. For example, in the second embodiment, the rotation member 242 includes the conductive pattern 242c for generating the pulse signal. However, a variable resistor may be arranged on the rotation member 242 in place of the conductive pattern 242c.

In the first output mechanism 21 of the second embodiment, the first position detection sensor 61 may be attached to the first deceleration gear 24 or the second deceleration gear 25. In the second output mechanism 31, the second position detection sensor 62 may be attached to the output gear 34.

The number of deceleration gears in each output mechanism 21, 31 is not limited to the number in the second embodiment as long as it is a plural number In the second embodiment, the number of output mechanisms 21, 31 accommodated in the housing 10 is two. However, three or more output mechanisms may be accommodated in the housing 10.

What is claimed is:

1. A motor actuator comprising:
  a plurality of output mechanisms, wherein each of the plurality of output mechanisms includes
  a motor including a motor power supplying terminal supplied with power,
  a plurality of deceleration gears that decelerate and output rotation of the motor,
  a position detection sensor including a rotation member, which is coupled to at least one of the plurality of deceleration gears and rotated integrally and coaxially with the at least one of the deceleration gears, and a sensor terminal, which contacts the rotation member and outputs a position detection signal corresponding to a rotation position of the deceleration gear,
  a sensor signal line that transmits the position detection signal output from the sensor terminal to a control unit that controls the rotation of the motor, and
  a power supplying terminal unit that is connected to the motor power supplying terminal to supply power to the motor; and
  a housing that accommodates the plurality of output mechanisms,
  wherein the sensor signal lines of the plurality of output mechanisms are formed integrally with each other.

2. The motor actuator according to claim 1, wherein the sensor signal line and the power supplying terminal unit are formed as separate bodies.

3. The motor actuator according to claim 1, further comprising an insulating member, wherein
the position detection sensor includes a holding member that holds the rotation member and the sensor terminal and is supported by the housing;
the sensor signal lines of the plurality of output mechanisms are formed integrally by the insulating member to ensure electrical insulating properties of the sensor signal lines;
the holding member and the insulating member are formed as separate bodies; and
the sensor terminal is connected to the corresponding sensor signal line.

4. The motor actuator according to claim 3, wherein
the sensor terminal includes a sensor connection portion that extends toward the connected sensor signal line;
the sensor signal line includes a line connection portion that projects from the insulating member and is overlapped and joined with the sensor connection portion;
at least one of the sensor connection portion and the line connection portion includes a bent portion that is bent;
the sensor connection portion and the line connection portion are overlapped and joined with each other to form a joining portion; and
the joining portion is arranged between the bent portion and a distal end of the sensor connection portion including the bent portion or between the bent portion and a distal end of the line connection portion including the bent portion.

5. The motor actuator according to claim 3, wherein the position detection sensor is arranged on the insulating member.

6. The motor actuator according to claim 3, wherein
the housing includes a first case and a second case, which are overlapped with each other, and a sensor fixing portion; and
the sensor fixing portion sandwiches and fixes the holding member in a coupling direction of the first case and the second case when the first case and the second case are overlapped and fixed.

* * * * *